US009340696B2

(12) United States Patent
Taya et al.

(10) Patent No.: US 9,340,696 B2
(45) Date of Patent: May 17, 2016

(54) INK, INK CARTRIDGE, AND IMAGE-RECORDING METHOD

(71) Applicant: CANON KABUSHIKI KAISHA, Tokyo (JP)

(72) Inventors: Akihiro Taya, Yokohama (JP); Masahiro Terada, Hadano (JP); Hidetaka Kawamura, Yokohama (JP); Yohei Masada, Tokyo (JP); Masanobu Ootsuka, Tokyo (JP); Takaharu Aotani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/691,363

(22) Filed: Apr. 20, 2015

(65) Prior Publication Data

US 2015/0299487 A1 Oct. 22, 2015

(30) Foreign Application Priority Data

Apr. 22, 2014 (JP) .................................. 2014-088605

(51) Int. Cl.
| | | |
|---|---|---|
| *B41J 2/15* | (2006.01) |
| *C09D 11/38* | (2014.01) |
| *C09D 11/36* | (2014.01) |
| *C09D 11/102* | (2014.01) |
| *C09D 11/107* | (2014.01) |
| *C09D 11/322* | (2014.01) |
| *C09D 11/40* | (2014.01) |
| *C09D 11/326* | (2014.01) |
| *C09D 11/324* | (2014.01) |

(52) U.S. Cl.
CPC ............. *C09D 11/38* (2013.01); *C09D 11/102* (2013.01); *C09D 11/107* (2013.01); *C09D 11/322* (2013.01); *C09D 11/36* (2013.01); *C09D 11/324* (2013.01); *C09D 11/326* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 2010/0196601 A1 | 8/2010 | Goto | |
| 2011/0037805 A1* | 2/2011 | Arai et al. | 347/21 |
| 2011/0069109 A1* | 3/2011 | Tojo | 347/21 |
| 2012/0320133 A1 | 12/2012 | Namba | |
| 2013/0258011 A1 | 10/2013 | Boris | |
| 2013/0258012 A1 | 10/2013 | Boris | |

FOREIGN PATENT DOCUMENTS

| | | |
|---|---|---|
| EP | 2028242 A1 | 2/2009 |
| EP | 2862906 A1 | 4/2015 |
| EP | 2862907 A1 | 4/2015 |

(Continued)

*Primary Examiner* — Lisa M Solomon
(74) *Attorney, Agent, or Firm* — Canon U.S.A., Inc., IP Division

(57) ABSTRACT

An ink including: a self-dispersing pigment; polymer particles; a surfactant; a water-soluble organic solvent; and water, wherein the amount of anionic functional group on the surface of the polymer particles is 0.2 mmol/g or less, the surfactant is represented by the general formula (1) and contains a fluorinated surfactant having a hydrophile-lipophile balance (HLB) of 11 or less as determined by a Griffin method, and the water-soluble organic solvent contains at least one water-soluble organic solvent selected from glycerin, ethylene glycol, diethylene glycol, poly(ethylene glycol) having a weight-average molecular weight of 10,000 or less, 1,3-propanediol, 1,4-butanediol, and diglycerol.

17 Claims, 1 Drawing Sheet

(56) References Cited

FOREIGN PATENT DOCUMENTS

| | | | |
|---|---|---|---|
| JP | 2008095089 A | 4/2008 | |
| JP | 2009-019198 A | 1/2009 | |
| JP | 2010-222417 A | 10/2010 | |

\* cited by examiner

INK, INK CARTRIDGE, AND IMAGE-RECORDING METHOD

BACKGROUND OF THE INVENTION

1. Field of the Invention

The present invention relates to an ink, an ink cartridge containing the ink, and an image-recording method in which the ink is used.

2. Description of the Related Art

In known image-recording methods, inks that contain a self-dispersing pigment as a coloring material are used to improve the optical density of images. Although inks that contain a self-dispersing pigment can produce images having relatively high optical density, the images have low scratch resistance. It is proposed in Japanese Patent Laid-Open No. 2009-019198 and No. 2010-222417 that polyurethane polymer particles or acrylic polymer particles are added to an ink that contains a self-dispersing pigment to improve the scratch resistance of images. Japanese Patent Laid-Open No. 2009-019198 describes an ink that contains a self-dispersing pigment and polyurethane polymer particles. Japanese Patent Laid-Open No. 2010-222417 describes an ink that contains a self-dispersing pigment and acrylic polymer particles.

SUMMARY OF THE INVENTION

An ink according to one aspect of the present invention contains a self-dispersing pigment, polymer particles, a surfactant, a water-soluble organic solvent, and water, wherein the amount of anionic functional group on the surface of the polymer particles is 0.2 mmol/g or less, the surfactant is represented by the following general formula (1) and contains a fluorinated surfactant having a hydrophile-lipophile balance (HLB) of 11 or less as determined by a Griffin method,

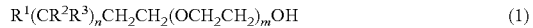

(1)

wherein $R^1$ denotes a fluorine atom or a hydrogen atom, $R^2$ and $R^3$ independently denote a fluorine atom or a hydrogen atom, and at least one of $R^2$ and $R^3$ denotes a fluorine atom, n is 1 or more and 30 or less, and m is 1 or more and 60 or less, and the water-soluble organic solvent contains at least one water-soluble organic solvent selected from the following group A:

glycerin, ethylene glycol, diethylene glycol, poly(ethylene glycol) having a weight-average molecular weight of 10,000 or less, 1,3-propanediol, 1,4-butanediol, and diglycerol.

Further features of the present invention will become apparent from the following description of exemplary embodiments with reference to the attached drawings.

DESCRIPTION OF THE EMBODIMENTS

Figure 1:
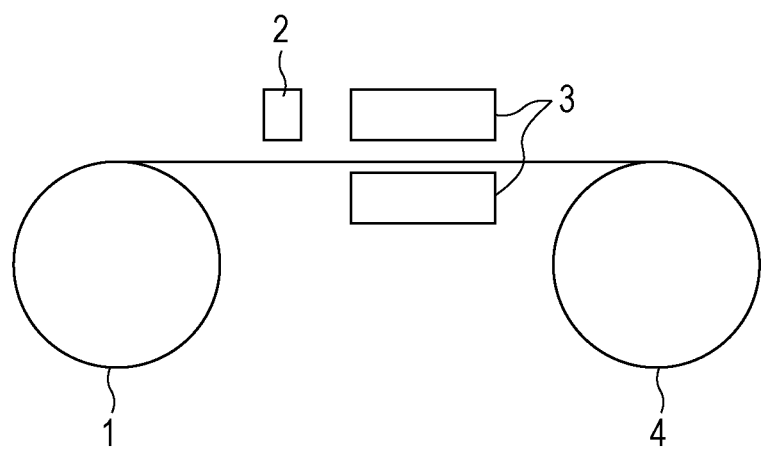
FIG. 1 is a schematic view of an image-recording apparatus for use in an image-recording method according to an embodiment of the present invention.

The present inventors found that although inks described in Japanese Patent Laid-Open No. 2009-019198 and No. 2010-222417 produced images having somewhat improved scratch resistance, the scratch resistance is still below the desired level. The present inventors also found that the addition of polymer particles decreased the optical density of images.

The present invention provides an ink that contains a self-dispersing pigment and polymer particles and produces images having high optical densities and scratch resistance. The present invention also provides an ink cartridge containing an ink according to an embodiment of the present invention and an image-recording method in which an ink according to an embodiment of the present invention is used.

The present invention will be further described with the embodiments.

As a result of extensive studies on a method for achieving high optical density and scratch resistance of images using an ink that contains a self-dispersing pigment and polymer particles, the present inventors arrived at one embodiment of the present invention, that is, a method of further using polymer particles having a particular amount of anionic functional group on the surface thereof in combination with a particular surfactant and a particular water-soluble organic solvent. The following is a possible mechanism by which the advantages of the present invention can be achieved by such a method.

As a result of extensive studies, the present inventors found that use of a particular fluorinated surfactant in an ink can improve the optical density and scratch resistance of images as compared with use of another surfactant. This is probably because the particular fluorinated surfactant decreases the contact angle of an ink on a recording medium as compared with another surfactant. Use of the particular fluorinated surfactant decreases the contact angle of an ink on a recording medium and spreads the ink on the surface of the recording medium. This allows a pigment and polymer particles to be more easily remained in the area around the surface of the recording medium and improves the optical density and scratch resistance of images. The studies of the present inventors show that not all the fluorinated surfactants have this effect, and fluorinated surfactants represented by the following general formula (1) and having a hydrophile-lipophile balance (HLB) of 11 or less as determined by a Griffin method are particularly effective.

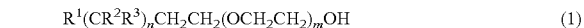

(1)

In the general formula (1), $R^1$ denotes a fluorine atom or a hydrogen atom, $R^2$ and $R^3$ independently denote a fluorine atom or a hydrogen atom, and at least one of $R^2$ and $R^3$ denotes a fluorine atom, n is 1 or more and 30 or less, and m is 1 or more and 60 or less.

However, the use of such a particular fluorinated surfactant cannot sufficiently improve the optical density and scratch resistance of images on some recording media. For example, use of a recording medium having high ink absorbency, such as plain paper, sometimes results in insufficient amounts of pigment and polymer particles remained in the area around the surface of the recording medium and low optical densities and scratch resistance of images.

The present inventors further studied the type of water-soluble organic solvent. As a result, the present inventors found that use of a particular water-soluble organic solvent in combination with the particular fluorinated surfactant in an ink allows a pigment and polymer particles to be remained in the area around the surface of a recording medium even having high ink absorbency, such as plain paper. The particular water-soluble organic solvent is at least one water-soluble organic solvent selected from glycerin, ethylene glycol, diethylene glycol, poly(ethylene glycol) having a weight-average molecular weight of 10,000 or less, 1,3-propanediol, and 1,4-butanediol. The present inventors found from various experiments that use of such a water-soluble organic solvent and such a fluorinated surfactant in combination can improve the optical density and scratch resistance of images. Although there is no clear reason for improved optical density and scratch resistance of images due to the use of such a particular fluorinated surfactant and such a particular water-soluble organic solvent in combination, the present inventors think that the improved optical density and scratch resistance of images results from two or more hydroxyl groups in the molecular structure of the particular water-soluble organic solvent, hydroxyl groups bound to both terminal carbon atoms of the molecular structure, and high symmetry of the molecular structure.

As a result of further studies, the present inventors found that when the amount of anionic functional group on the surface of polymer particles is 0.2 mmol/g or less, this can enhance the effect of improving the optical density and scratch resistance of images. Polymer particles having a smaller amount of anionic functional group on the surface thereof can more easily aggregate on a recording medium, and the polymer particles, together with a pigment, are more easily remained in the area around the surface of a recording medium and further increase the optical density of images. The polymer particles that are remained in the area around the surface of a recording medium and protect the pigment can improve scratch resistance.

As described above, when an ink contains a self-dispersing pigment, polymer particles having a particular amount of anionic functional group on the surface thereof, the particular fluorinated surfactant, and the particular water-soluble organic solvent, the pigment and the polymer particles can be remained in the area around the surface of any recording medium. Thus, due to the synergistic effects of these components, the advantages of the present invention, that is, high optical density and scratch resistance of images can be achieved.

[Ink]

An ink according to an embodiment of the present invention contains a self-dispersing pigment (hereinafter also referred to simply as a "pigment"), polymer particles having 0.2 mmol/g or less of an anionic functional group on the surface thereof, a fluorinated surfactant represented by the general formula (1) and having HLB of 11 or less (hereinafter also referred to simply as a "surfactant represented by the general formula (1)"), a water-soluble organic solvent, and water. The components for use in an ink according to an embodiment of the present invention will be described below.

<Self-Dispersing Pigment>

The term "self-dispersing pigment", as used herein, refers to a pigment to which at least one hydrophilic group is bound directly or via another atomic group (—R—). Examples of the hydrophilic group include, but are not limited to, —COOM, —SO$_3$M, —PO$_3$HM, and —PO$_3$M$_2$, wherein "M" can be a hydrogen atom, an alkali metal, ammonium, or an organic ammonium. The ink ejection stability is higher in the case that "M" is an alkali metal, such as lithium, sodium, or potassium, than in the case that "M" is ammonium or an organic ammonium. The hydrophilic group(s) may be partly or entirely dissociated in ink. Examples of the other atomic group (—R—) include, but are not limited to, alkylene groups having 1 to 12 carbon atoms, substituted and unsubstituted phenylene groups, and substituted and unsubstituted naphthylene groups.

Type of Self-Dispersing Pigment

Examples of pigments for use in an ink according to an embodiment of the present invention include, but are not limited to, inorganic and organic pigments and known pigments for use in inks.

Examples of self-dispersing inorganic pigments include, but are not limited to, pigments manufactured by introducing a hydrophilic group onto the surface of known inorganic pigments, such as carbon black. Examples of self-dispersing carbon black include, but are not limited to, CAB-O-JET200, 300, 352K, and 400 (manufactured by Cabot Corporation).

Examples of self-dispersing organic pigments include, but are not limited to, pigments manufactured by introducing a hydrophilic group onto the surface of known organic pigments. Specific pigments are described below. Cyan pigments may be copper phthalocyanine pigments. Specific examples of cyan pigments include, but are not limited to, C.I. Pigment Blue 1, 2, 3, 15, 15:2, 15:3, 15:4, 16, 22, and 60. Examples of self-dispersing cyan pigments include, but are not limited to, CAB-C)-JET250C, 450C, and 554B (manufactured by Cabot Corporation). Magenta pigments may be quinacridone pigments. Specific examples of magenta pigments include, but are not limited to, C.I. Pigment Red 5, 7, 12, 48, 48:1, 57, 112, 122, 123, 146, 168, 184, 202, and 207. Examples of self-dispersing magenta pigments include, but are not limited to, CAB-O-JET260M, 265M, and 465M (manufactured by Cabot Corporation). Yellow pigments may be azo pigments. Specific examples of yellow pigments include, but are not limited to, C.I. Pigment Yellow 12, 13, 14, 16, 17, 74, 83, 93, 95, 97, 98, 114, 128, 129, 151, and 154. Examples of self-dispersing yellow pigments include, but are not limited to, CAB-O-JET270Y, 470Y, and 740Y (manufactured by Cabot Corporation).

Self-Dispersing Pigment Content

The self-dispersing pigment content of an ink according to an embodiment of the present invention is preferably 0.1% by mass or more and 5.0% by mass or less, more preferably 1.0% by mass or more and 4.0% by mass or less. A self-dispersing pigment content of less than 1.0% by mass may result in an insufficient effect of improving the optical density of images. A self-dispersing pigment content of more than 4.0% by mass may result in insufficient sticking resistance.

The total of the self-dispersing pigment content and the polymer particle content of an ink according to an embodiment of the present invention is preferably 12% by mass or less, more preferably 10% by mass or less. A total content of more than 12% by mass may result in insufficient ink ejection stability.

The ratio of the self-dispersing pigment content to the polymer particle content of an ink according to an embodiment of the present invention is preferably 0.5 or more and 4 or less, more preferably 1 or more and 4 or less, still more preferably 2 or more and 4 or less, on a mass basis. When this mass ratio is less than 0.5, this may result in a low self-dispersing pigment content and an insufficient effect of improving the optical density of images. When the mass ratio is more than 4, this may result in a low polymer particle content and an insufficient effect of improving the scratch resistance of images.

<Polymer Particles>

An ink according to an embodiment of the present invention contains polymer particles having 0.2 mmol/g or less of an anionic functional group on the surface thereof. The amount of anionic functional group on the surface of the polymer particles is preferably 0.15 mmol/g or less, more preferably 0.10 mmol/g or less. The amount of anionic functional group on the surface of the polymer particles is preferably more than 0 mmol/g, more preferably 0.03 mmol/g or more.

Examples of the anionic functional group include, but are not limited to, —COOM, —SO$_3$M, —PO$_3$HM, and —PO$_3$M$_2$, wherein "M" denotes a hydrogen atom, an alkali metal, ammonium, or an organic ammonium.

The term "polymer particles", as used herein, refers to a polymer dispersed in a solvent in a state in which the polymer has a particle size. In accordance with an embodiment of the present invention, the polymer particles preferably has a 50% cumulative volume-average particle size ($D_{50}$) of 1 nm or more and 100 nm or less, more preferably 5 nm or more and 50 nm or less. $D_{50}$ of polymer particles may be measured in a polymer particle dispersion diluted 50-fold (on a volume basis) with pure water using UPA-EX150 (manufactured by Nikkiso Co., Ltd.) under the measurement conditions of Set-Zero: 30 s, the number of measurements: 3, measurement time: 180 seconds, and refractive index: 1.5.

The polymer particles may be known polymer particles and may be at least one selected from polyurethane polymer particles and acrylic polymer particles. The polyurethane polymer particles and acrylic polymer particles will be described below.

<1> Polyurethane Polymer Particles

Physical Properties of Polyurethane Polymer Particles

Polyurethane polymer particles for use in an ink according to an embodiment of the present invention preferably have a polystyrene-equivalent weight-average molecular weight (Mw) of more than 5,000 and 150,000 or less, more preferably 8,000 or more and 100,000 or less, as determined by gel permeation chromatography (GPC). When the polystyrene-equivalent weight-average molecular weight (Mw) is 5,000 or less, the polyurethane polymer particles may have low strength and an insufficient effect of improving the scratch resistance of images. When the polystyrene-equivalent weight-average molecular weight (Mw) is more than 150,000, the ink may have insufficient storage stability and ejection stability. The weight-average molecular weight of the polymer particles may be determined with an apparatus Alliance GPC 2695 (manufactured by Waters), four columns of Shodex KF-806M (manufactured by Showa Denko K.K.) in series, and a refractive index (RI) detector and may be calculated using polystyrene standard samples PS-1 and PS-2 (manufactured by Polymer Laboratories).

Polyurethane polymer particles for use in an ink according to an embodiment of the present invention preferably have an acid value of 100 mgKOH/g or less, more preferably 5 mgKOH/g or more and 30 mgKOH/g or less. The acid value of the polyurethane polymer particles can be measured by titrimetry. For example, the acid value may be measured by potentiometric titration of polymer particles dissolved in THF using an automatic potentiometric titrator AT510 (manufactured by Kyoto Electronics Manufacturing Co., Ltd.) and a potassium hydroxide ethanol titrant.

Polyurethane polymer particles for use in an ink according to an embodiment of the present invention preferably have a glass transition temperature (Tg) of −80° C. or more, more preferably −50° C. or more. The glass transition temperature (Tg) is preferably 120° C. or less, more preferably 100° C. or less.

Polyurethane Polymer Particle Content

The polyurethane polymer particle content of an ink according to an embodiment of the present invention is preferably 0.1% by mass or more and 10.0% by mass or less. A polyurethane polymer particle content of less than 0.1% by mass may result in an insufficient effect of improving the scratch resistance of images. A polyurethane polymer particle content of more than 10.0% by mass may result in insufficient ink ejection stability.

The ratio of the polyurethane polymer particle content to the fluorinated surfactant content of an ink according to an embodiment of the present invention is preferably 0.5 or more and 4.0 or less, more preferably 1.0 or more and 3.0 or less, on a mass basis. When this mass ratio is less than 0.5, this may result in a low polyurethane polymer particle content and an insufficient effect of improving the scratch resistance of images. When the mass ratio is more than 4.0, this may result in a low fluorinated surfactant content, an insufficient amount of polymer-dispersed pigment remained in the area around the surface of a recording medium, and an insufficient effect of improving the optical density and scratch resistance of images.

Method for Producing Polyurethane Polymer Particles

Polyurethane polymer particles for use in an ink according to an embodiment of the present invention may be produced by any known method, for example, by the following method. A polyol having no acid group is well stirred and dissolved in an organic solvent, such as methyl ethyl ketone, and is allowed to react with a polyisocyanate and a diol having an acid group, thereby producing an urethane prepolymer solution. The urethane prepolymer solution is then neutralized. After ion-exchanged water is added to the urethane prepolymer solution, the urethane prepolymer solution is agitated at a high speed and is emulsified in a homo mixer. After emulsification, a chain extension agent is added to the emulsion, and the urethane prepolymer is subjected to a chain extension reaction.

The materials of polyurethane polymer particles for use in an ink according to an embodiment of the present invention will be described below.

(1) Polyisocyanate

Polyurethane polymer particles for use in an ink according to an embodiment of the present invention can include a polyisocyanate-derived unit. The term "polyisocyanate", as used herein, refers to a compound having two or more isocyanate groups. Examples of polyisocyanates for use in the present invention include, but are not limited to, aliphatic polyisocyanates, alicyclic polyisocyanates, aromatic polyisocyanates, and araliphatic polyisocyanates. The percentage of a polyisocyanate-derived unit in the polyurethane polymer particles can be 10.0% by mass or more and 80.0% by mass or less.

Examples of the aliphatic polyisocyanate include, but are not limited to, tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanates include, but are not limited to, isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis(isocyanatomethyl)cyclohexane. Examples of the aromatic polyisocyanates include, but are not limited to, tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Examples of the araliphatic polyisocyanate include, but are not limited to, dialkyldiphenylmethane diisocyanate, tetraalkyldiphenylmethane diisocyanate, and α,α,α,α-tetramethylxylylene diisocyanate. These polyisocyanates may be used alone or in combination. In accordance with an embodiment of the present invention, among these polyisocyanates, at least one selected from isophorone diisocyanate, hexamethylene diisocyanate, and dicyclohexylmethane 4,4'-diisocyanate may be used.

(2) Polyol Having No Acid Group

Polyurethane polymer particles for use in an ink according to an embodiment of the present invention can include a unit derived from a polyol having no acid group. The percentage of a unit derived from a polyol having no acid group in the polyurethane polymer particles is preferably 0.1% by mass or more and 80.0% by mass or less.

Examples of the polyol having no acid group include, but are not limited to, polyester polyols, polyether polyols, and polycarbonate diols. The polyol having no acid group preferably has 13 or more and 250 or less carbon atoms. The polyol having no acid group preferably has a polystyrene-equivalent number-average molecular weight of 600 or more and 4,000 or less as determined by GPC.

Examples of the polyester polyols include, but are not limited to, esters of acid components and polyalkylene glycols, dihydric alcohols, or tri- or higher-valent polyhydric alcohols. Examples of the acid components of the polyester polyols include, but are not limited to, aromatic dicarboxylic acids, alicyclic dicarboxylic acids, and aliphatic dicarboxylic acids. Examples of the aromatic dicarboxylic acids include, but are not limited to, isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid. Examples of the alicyclic dicarboxylic acids include, but are not limited to, hydrogenated compounds of the aromatic dicarboxylic acids. Examples of the aliphatic dicarboxylic acids include, but are not limited to, malonic acid, succinic acid, tartaric acid, oxalic acid, glutaric acid, adipic acid, pimelic acid, suberic acid, azelaic acid, sebacic acid, alkylsuccinic acid, linolenic acid, maleic acid, fumaric acid, mesaconic acid, citraconic acid, and itaconic acid. Reactive derivatives of these acid components, such as acid anhydrides, alkyl esters, and acid halides, can also be used as acid components of the polyester polyols. The acid components of the polyester polyols may be used alone or in combination. Examples of the polyalkylene glycols include, but are not limited to, poly(ethylene glycol), poly(propylene glycol), poly(tetramethylene glycol), and ethylene glycol-propylene glycol copolymers. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the tri- or higher-valent polyhydric alcohols include, but are not limited to, glycerin, trimethylolpropane, 1,2,5-hexanetriol, 1,2,6-hexanetriol, and pentaerythritol. These polyester polyols may be used alone or in combination.

Examples of the polyether polyols include, but are not limited to, polyalkylene glycols and addition polymers of alkylene oxides and dihydric alcohols or tri- or higher-valent polyhydric alcohols. Examples of the polyalkylene glycols include, but are not limited to, poly(ethylene glycol), poly(propylene glycol), poly(tetramethylene glycol), and ethylene glycol-propylene glycol copolymers. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the tri- or higher-valent polyhydric alcohols include, but are not limited to, glycerin, trimethylolpropane, 1,2,5-hexanetriol, 1,2,6-hexanetriol, and pentaerythritol. Examples of the alkylene oxides include, but are not limited to, ethylene oxide, propylene oxide, butylene oxide, and α-olefin oxides. These polyether polyols may be used alone or in combination.

The polycarbonate diols may be produced by conventional methods. Examples of the polycarbonate diols include, but are not limited to, polycarbonate diols produced by reactions between a carbonate component, such as an alkylene carbonate, diary carbonate, or dialkyl carbonate, or phosgene and an aliphatic diol component. These polycarbonate diols may be used alone or in combination.

Among the polyols having no acid group, polyether polyols may be used. Polyether polyols impart moderate flexibility to a polymer film and tend to improve the scratch resistance of images. Furthermore, polyether polyols have relatively high hydrophilicity and therefore improve ink ejection stability. Among polyether polyols, poly(propylene glycol) may be used.

(3) Diol Having Acid Group

Polyurethane polymer particles for use in an ink according to an embodiment of the present invention can include a unit derived from a diol having an acid group. The term "a diol having an acid group", as used herein, refers to a diol having an acid group, such as a carboxy group, a sulfonic acid group, or a phosphate group. The diol having an acid group may be in the form of a salt with an alkali metal, such as Li, Na, or K, ammonia, or an organic amine, such as dimethylamine. The diol having an acid group can be dimethylolpropionic acid or dimethylolbutanoic acid. These diols having an acid group may be used alone or in combination. The percentage of a unit derived from a diol having an acid group in the polyurethane polymer particles is preferably 5.0% by mass or more and 40.0% by mass or less.

(4) Chain Extension Agent

In accordance with an embodiment of the present invention, a chain extension agent may be used to produce polyurethane polymer particles. A chain extension agent is a compound that can react with a residual isocyanate group in a polyisocyanate unit of a urethane prepolymer. The residual isocyanate group is an isocyanate group that did not form a urethane bond. Examples of the chain extension agent include, but are not limited to, polyvalent amine compounds, such as trimethylolmelamine and derivatives thereof, dimethylolurea and derivatives thereof, dimethylolethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. Examples of the chain extension agent also include, but are not limited to, ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, poly(ethylene glycol), 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane, and pentaerythritol. These chain extension agents may be used alone or in combination.

<2> Acrylic Polymer Particles

Physical Properties of Acrylic Polymer Particles

Acrylic polymer particles for use in an ink according to an embodiment of the present invention preferably have a polystyrene-equivalent weight-average molecular weight (Mw) of more than 100,000 and 3,000,000 or less, more preferably 300,000 or more and 1,000,000 or less, as determined by gel permeation chromatography (GPC). When the polystyrene-equivalent weight-average molecular weight (Mw) is 100,000 or less, the acrylic polymer particles may have low strength and an insufficient effect of improving the scratch resistance of images. When the polystyrene-equivalent weight-average molecular weight (Mw) is more than 150,000, the ink may have insufficient storage stability and ejection stability. The weight-average molecular weight of the polymer particles may be determined with an apparatus Alliance GPC 2695 (manufactured by Waters), four columns of Shodex KF-806M (manufactured by Showa Denko K.K.) in series, and a refractive index (RI) detector and may be calculated using polystyrene standard samples PS-1 and PS-2 (manufactured by Polymer Laboratories).

Acrylic polymer particles for use in an ink according to an embodiment of the present invention preferably have an acid value of 150 mgKOH/g or less, more preferably 25 mgKOH/g or more and 140 mgKOH/g or less. The acid value of the acrylic polymer particles can be measured by titrimetry. For example, the acid value may be measured by potentiometric titration of polymer particles dissolved in THF using an automatic potentiometric titrator AT510 (manufactured by Kyoto Electronics Manufacturing Co., Ltd.) and a potassium hydroxide ethanol titrant.

Acrylic polymer particles for use in an ink according to an embodiment of the present invention preferably have a glass transition temperature (Tg) of −20° C. or more, more preferably −10° C. or more, still more preferably 25° C. or more.

The glass transition temperature (Tg) is preferably 120° C. or less, more preferably 100° C. or less.

Acrylic Polymer Particle Content

The acrylic polymer particle content of an ink according to an embodiment of the present invention is preferably 0.1% by mass or more and 10.0% by mass or less. An acrylic polymer particle content of less than 0.1% by mass may result in an insufficient effect of improving the scratch resistance of images. An acrylic polymer particle content of more than 10.0% by mass may result in insufficient ink ejection stability.

The ratio of the acrylic polymer particle content to the fluorinated surfactant content of an ink according to an embodiment of the present invention is preferably 0.5 or more and 4.0 or less, more preferably 1.0 or more and 3.0 or less, on a mass basis. When this mass ratio is less than 0.5, this may result in a low acrylic polymer particle content and an insufficient effect of improving the scratch resistance of images. When the mass ratio is more than 4.0, this may result in a low fluorinated surfactant content, an insufficient amount of polymer-dispersed pigment remained in the area around the surface of a recording medium, and an insufficient effect of improving the optical density and scratch resistance of images.

Monomer for Acrylic Polymer Particles

Examples of a monomer for acrylic polymer particles for use in an ink according to an embodiment of the present invention include, but are not limited to, alkyl (meth)acrylates, such as methyl (meth)acrylate, ethyl (meth)acrylate, propyl (meth)acrylate, butyl (meth)acrylate, hexyl (meth)acrylate, octyl (meth)acrylate, lauryl (meth)acrylate, and stearyl (meth)acrylate; and (meth)acrylic acids, such as acrylic acid and methacrylic acid. The acrylic polymer particles may be formed of a homopolymer of such a monomer or a copolymer of such a monomer and another monomer. Examples of the other monomer include, but are not limited to, vinyl esters, olefins, styrenes, crotonic acids, itaconic acids, maleic acids, fumaric acids, acrylamides, ally compounds, vinyl ethers, vinyl ketones, glycidyl esters, and unsaturated nitriles. When the acrylic polymer particles are formed of a copolymer, a unit derived from an alkyl (meth)acrylate or (meth)acrylic acid preferably constitutes 50% by mol or more of the copolymer.

<3> Method for Measuring Amount of Anionic Functional Group on Surface of Polymer Particles The amount of anionic functional group on the surface of polymer particles can be measured by colloid titration of an aqueous dispersion of the polymer particles. In the exemplary embodiments described below, the amount of anionic functional group on the surface of polymer particles in a polymer particle dispersion was measured by colloid titration utilizing potential difference using an automatic potentiometric titrator (AT-510; manufactured by Kyoto Electronics Manufacturing Co., Ltd.) equipped with a stream potential titration unit (PCD-500). Methyl glycol chitosan was used as a titration reagent.

In order to measure the amount of anionic functional group on the surface of polymer particles in an ink, first, the polymer particles must be separated from a pigment. An ink is centrifuged at 23° C. and at 440,000 G for 2 hours. A supernatant containing polymer particles is collected. The amount of anionic functional group on the surface of the polymer particles can be measured by the method described above.

<Surfactant>

An ink according to an embodiment of the present invention contains a surfactant represented by the following general formula (1) and having HLB of 11 or less.

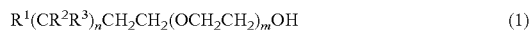   (1)

In the general formula (1), $R^1$ denotes a fluorine atom or a hydrogen atom, $R^2$ and $R^3$ independently denote a fluorine atom or a hydrogen atom, and at least one of $R^2$ and $R^3$ denotes a fluorine atom, n is 1 or more and 30 or less, and m is 1 or more and 60 or less.

As described above, the fluorinated surfactant has HLB of 11 or less, as determined by a Griffin method. The fluorinated surfactant preferably has HLB of 6 or more and 11 or less. HLB determined by a Griffin method is defined by "20× the sum total of formula weights of hydrophilic moieties/molecular weight". In the general formula (1), "$CH_2CH_2(OCH_2CH_2)_mOH$" is a "hydrophilic moiety".

Examples of the fluorinated surfactant represented by the general formula (1) and having HLB of 11 or less include, but are not limited to, FS-3100, FS-30, FSO, and FSN-100 (manufactured by Du Pont), Megaface F-444 (manufactured by DIC Corporation), and DSN403N (manufactured by Daikin Industries, Ltd.).

The amount of surfactant represented by the general formula (1) is preferably 0.1% by mass or more and less than 2.0% by mass of the ink.

An ink according to an embodiment of the present invention may further contain a surfactant that is different from the surfactant represented by the general formula (1). For example, the other surfactant may be a nonionic surfactant, such as acetylene glycol or an ethylene oxide adduct of acetylene glycol. In this case, the amount of surfactant other than the surfactant represented by the general formula (1) is preferably 0.1% by mass or less of the ink.

<Water and Water-Soluble Organic Solvent>

An ink according to an embodiment of the present invention contains water and a water-soluble organic solvent. Water can be deionized water (ion-exchanged water). The water content of the ink is preferably 50% by mass or more and 90% by mass or less.

The term "water-soluble organic solvent", as used herein, refers to an organic solvent having water solubility of 500 g/l or more at 20° C. The water-soluble organic solvent may be any known water-soluble organic solvent for use in inks. Examples of such a water-soluble organic solvent include, but are not limited to, alcohols, glycols, alkylene glycols, poly(ethylene glycol), nitrogen-containing compounds, and sulfur-containing compounds. These water-soluble organic solvents may be used alone or in combination as required. The water-soluble organic solvent content of an ink according to an embodiment of the present invention is preferably 50% by mass or less, more preferably 5% by mass or more and 45% by mass or less.

An ink according to an embodiment of the present invention contains at least one water-soluble organic solvent selected from the group A consisting of glycerin, ethylene glycol, diethylene glycol, poly(ethylene glycol) having a weight-average molecular weight of 10,000 or less, 1,3-propanediol, 1,4-butanediol, and diglycerol. In accordance with an embodiment of the present invention, in particular, the total amount of water-soluble organic solvent(s) selected from the group A can be greater than the total amount of water-soluble organic solvent(s) not belonging to the group A. The ratio of the total amount of water-soluble organic solvent(s) selected from the group A to the total amount of water-soluble organic solvent(s) not belonging to the group A in the ink is preferably 3 or more, more preferably 10 or more, on a mass basis.

In accordance with an embodiment of the present invention, the total amount of water-soluble organic solvent(s) selected from the group A is preferably 50% by mass or less, more preferably 5% by mass or more and 45% by mass or less, still more preferably 10% by mass or more and 40% by mass or less, of the ink.

<Additive Agents>

An ink according to an embodiment of the present invention may also contain an additive agent, such as a surfactant other than the surfactants described above, a pH adjuster, an anticorrosive, a preservative, a fungicide, an antioxidant, a reducing inhibitor, an evaporation promoter, and/or a chelator.

In particular, an ink according to an embodiment of the present invention can contain at least one additive agent selected from the following group B (hereinafter also referred to as a "group B additive agent"):
tetritol, pentitol, hexitol, heptitol, octitol, and poly(ethylene glycol) having a weight-average molecular weight of more than 10,000 and 100,000 or less.

The group B additive agent in an ink can improve ink ejection stability while high optical density and scratch resistance are maintained.

The total amount of tetritol, pentitol, hexitol, heptitol, and octitol of the group B is preferably 3% by mass or more and 20% by mass or less, more preferably 5% by mass or more and 10% by mass or less, of the ink. The amount of poly(ethylene glycol) having a weight-average molecular weight of more than 10,000 and 100,000 or less of the group B is preferably 0.0001% by mass or more and 10% by mass or less, more preferably 0.001% by mass or more and 5% by mass or less, of the ink. An ink according to an embodiment of the present invention preferably has a viscosity of 2 cP or more and 10 cP or less.

[Ink Cartridge]

An ink cartridge according to an embodiment of the present invention includes an ink storage portion for storing an ink according to an embodiment of the present invention. The ink storage portion may include an ink containing chamber for storing liquid ink and a chamber for housing a negative-pressure-generating member. The negative-pressure-generating member can store ink by the action of a negative pressure. Alternatively, an ink cartridge according to an embodiment of the present invention may include no ink containing chamber for storing liquid ink and include an ink storage portion that includes a negative-pressure-generating member for storing the whole accommodating amount of ink. Alternatively, an ink cartridge according to an embodiment of the present invention may include an ink storage portion and a recording head.

[Image-Recording Method]

An image-recording method according to an embodiment of the present invention includes an ink-applying process for applying an ink according to an embodiment of the present invention to a recording medium. An image-recording method according to an embodiment of the present invention may further include a conveyance process for conveying a recording medium and a heating process for heating the recording medium to which an ink has been applied.

FIG. 1 is a schematic view of an image-recording apparatus for use in an image-recording method according to an embodiment of the present invention. In the image recording apparatus illustrated in FIG. 1, recording is performed on a roll of recording medium, and the recording medium is rolled up after recording. The image recording apparatus includes a recording medium supply unit 1 configured to hold a roll of recording medium and supply the recording medium, an ink-applying unit 2 configured to apply inks to the recording medium, a heating unit 3 configured to heat the recording medium, and a recording medium collecting unit 4 configured to roll the recording medium on which an image is recorded. The recording medium is subjected to the treatments in the units as described above while being conveyed using a conveying unit including a pair of rolls and a belt along a recording medium transport path represented by a solid line in the figure. The recording medium rolled up with the recording medium collecting unit 4 may be supplied to another apparatus to cut the recording medium into a desired size or bind the recording media.

In accordance with an embodiment of the present invention, in a conveyance process for conveying a recording medium, the recording medium is preferably conveyed at a speed of 50 m/min or more, more preferably 100 m/min or more.

In accordance with an embodiment of the present invention, a recording medium is conveyed under tension. In other words, an image-recording apparatus can include a tension-applying unit configured to produce tension. More specifically, a conveying mechanism between the recording medium supply unit 1 and the recording medium collecting unit 4 in FIG. 1 may include a tension-applying unit configured to apply tension to a recording medium and/or a tension control unit configured to control the tension of the recording medium. Tension applied to a recording medium can prevent fibers of the recording medium from being swollen with water contained in ink. When fibers of a recording medium are swollen, ink permeates the recording medium at a higher speed due to increased gaps between the swollen fibers of the recording medium, and the ink deeply permeates the recording medium. This may result in insufficient optical densities of images. As described above, tension applied to a recording medium can prevent fibers of the recording medium from being swollen with water contained in ink and thereby suppress the decrease in optical density of images resulting from the high permeation speed.

The tension applied to a recording medium is preferably 20 N/m or more. The swelling of fibers of a recording medium with water contained in ink can be more efficiently suppressed at a tension of 20 N/m or more. The tension applied to a recording medium is preferably 30 N/m or more, more preferably 40 N/m or more and 100 N/m or less.

An ink-applying process and a heating process will be described below.

(1) Ink-Applying Process

In accordance with an embodiment of the present invention, an ink is applied to a recording medium in an ink-applying process. An ink can be applied to a recording medium using an ink jet system. In other words, an image-recording method according to an embodiment of the present invention can be an ink jet recording method. The ink jet system may be a thermal ink jet system or a piezoelectric ink jet system. In the thermal ink jet system, an ink is ejected through an ejection port of a recording head by the action of thermal energy. In the piezoelectric ink jet system, an ink is ejected through an ejection port of a recording head using a piezoelectric element.

The recording head may be of a serial type or a full-line type. The recording head of the serial type is scanned in a direction across the recording medium conveyance direction. In the recording head of the full-line type, a plurality of nozzles are arranged to cover the expected maximum width of recording media. Ink jet recording heads of the full-line type allow images to be recorded at higher speeds. Ink jet recording heads of the full-line type can have nozzles arranged in a direction perpendicular to the recording medium conveyance direction. Ink jet recording heads of the full-line type for each color can be arranged in parallel along the conveyance direction.

(2) Heating Process

In accordance with an embodiment of the present invention, in a heating process, a recording medium to which the ink has been applied can be heated to a surface temperature of 70° C. or more. The phrase "the surface temperature of a recording medium to which an ink has been applied", as used herein, refers to the surface temperature of a recording medium at a position that the recording medium reaches 0.5 seconds after an ink has been applied to the recording medium. More specifically, the surface temperature of an ink recording area X of a recording medium is measured at a position "V×0.5/60 (m)" separated in the recording medium conveyance direction from a position at which an ink is applied to the ink recording area X (directly under a recording head in the case of an ink jet recording head of the full-line type), wherein V (m/min) denotes the transfer speed of the recording medium. In the exemplary embodiments of the present invention, the surface temperature of a recording medium was measured with a noncontact infrared thermometer digital radiation temperature sensor FT-H20 (manufactured by Keyence Corp.) at a position generally vertically separated by 10 cm from a surface of the recording medium.

In accordance with an embodiment of the present invention, the surface temperature of a recording medium to which an ink has been applied is preferably 80° C. or more. In order to prevent the thermal deformation of a recording medium, the surface temperature of the recording medium is preferably 140° C. or less. A recording medium may be heated with a heater from the front side (the side to which an ink is applied) and/or the back side of the recording medium.

In accordance with an embodiment of the present invention, heating in the heating process may be continuously performed before, during, and after the application of an ink. In accordance with an embodiment of the present invention, before an ink is applied to a recording medium, the recording medium is not heated, or even when the recording medium is heated, the surface temperature of the recording medium is preferably less than 70° C., more preferably 60° C. or less, still more preferably 40° C. or less.

In the heating process, a recording medium may be heated while the recording medium is pressed, for example, with a pressure roller. Pressing a recording medium can improve the fixability of images. A recording medium may be pressed during part of the heating process rather than throughout the heating process. A recording medium may be pressed stepwise. The heating process may be followed by a pressing process.

<Recording Medium>

In an image-recording method according to an embodiment of the present invention, a recording medium to which an ink is applied may be any generally used recording medium. Examples of such a recording medium include, but are not limited to, permeable recording media, such as plain paper and glossy paper; less permeable recording media, such as print sheets; and non-permeable recording media, such as glass, plastics, and films. In particular, recording media for use in the present invention can be highly permeable recording media having a water absorption coefficient Ka of 0.3 mL/m²·ms^{1/2} or more.

Figure 2:
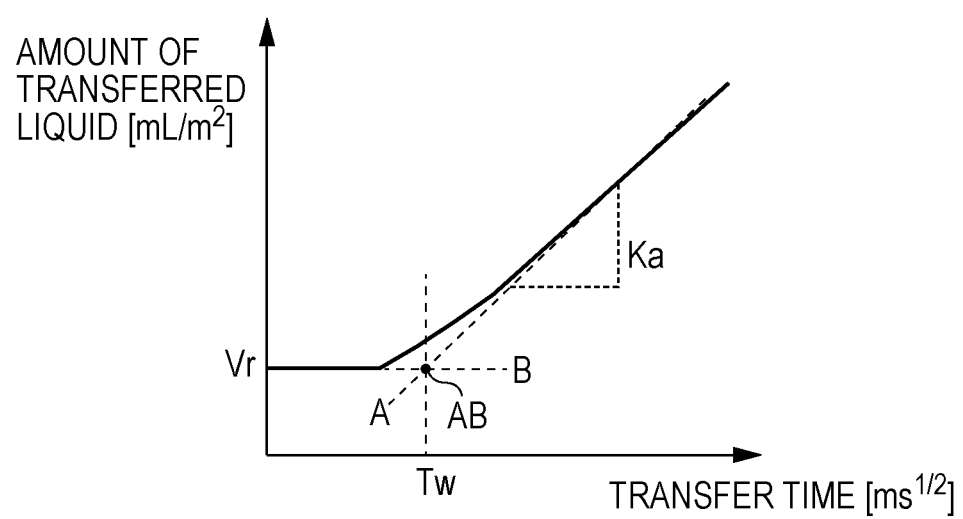
FIG. 2 is a graph of an absorption curve from which the absorption coefficient Ka of a recording medium is determined.

In accordance with an embodiment of the present invention, the absorption coefficient Ka of a recording medium is calculated by using a Bristow method described in a JAPAN TAPPI paper pulp test method No. 51, "Kami oyobi itagami no ekitai kyushusei shiken hobo (liquid absorption test method for paper and paper board)". The Bristow method is described in many commercially available books and is not described in detail herein. The Bristow method is defined by the wetting time Tw, the absorption coefficient Ka (mL/m²·ms^{1/2}), and the roughness index Vr (mL/m²). FIG. 2 illustrates an absorption curve. The absorption curve illustrated in FIG. 2 is based on a permeability model, in which a liquid on a recording medium begins to permeate the recording medium after a wetting time Tw. The slope of a straight line after the wetting time Tw represents the absorption coefficient Ka. The absorption coefficient Ka corresponds to the permeation speed of the liquid in the recording medium. As illustrated in FIG. 2, the wetting time Tw is the time to reach an intersection point AB between an approximate straight line A, which is drawn using the least squares method and from which the absorption coefficient Ka is calculated, and a straight line B of V=Vr wherein V denotes the amount of transferred liquid and Vr denotes the roughness index. In accordance with an embodiment of the present invention, the liquid permeating the recording medium is water having a temperature of 25° C. Thus, the absorption coefficient Ka is a water absorption coefficient at 25° C.

A recording medium for use in an ink jet recording method according to an embodiment of the present invention may be a recording medium having a desired size or a rolled recording medium, which is cut into a desired size after the image formation. It is easy to apply tension to a rolled recording medium.

EXAMPLES

The present invention will be further described with the following exemplary embodiments and comparative examples. However, the present invention should not be limited to these exemplary embodiments. Unless otherwise specified, "part" in the exemplary embodiments is on a mass basis.

[Preparation of Ink]

Inks were prepared by mixing and dispersing the raw materials of each composition (% by mass) listed in the following tables 2 to 8 and passing the mixture through a glass filter AP20 (manufactured by MILLIPORE). A self-dispersing pigment CAB-O-JET460M (manufactured by Cabot Corporation) was used as a pigment. A polyurethane polymer particle dispersion and an acrylic polymer particle dispersion were used as polymer particles. The pigment content (% by mass) and the polymer particle content (% by mass) in the following tables indicate the respective solid contents (% by mass) of the ink. In the tables, surfactants represented by the general formula (1) are referred to as "General formula (1)", and surfactants not represented by the general formula (1) are referred to as "Other than general formula (1)". In the tables, water-soluble organic solvents of the group A are referred to as "Group A", and water-soluble organic solvents not belonging to the group A are referred to as "Other than group A". Additive agents of the group B are referred to as "Group B", and additive agents not belonging to the group B are referred to as "Other than group B".

Group A:
Glycerin, ethylene glycol, diethylene glycol, poly(ethylene glycol) having a weight-average molecular weight of 10,000 or less, 1,3-propanediol, 1,4-butanediol, and diglycerol.

Group B:
Tetritol, pentitol, hexitol, heptitol, octitol, and poly(ethylene glycol) having a weight-average molecular weight of more than 10,000 and 100,000 or less.

The following are the names and physical properties of the polymer particles and the abbreviations of the surfactants in the tables.

<Polymer Particles>

TABLE 1

Names and Physical Properties of Polymer Particles

| Type | Name | Manufacturer | Amount of anionic functional group on surface (mmol/g) | Glass transition temperature Tg (° C.) |
|---|---|---|---|---|
| Polyurethane polymer particle dispersion | SF-300 | Dai-ichi Kogyo Seiyaku Co., Ltd. | 0.032 | −42 |
| | HUX-561 | Adeka Corporation | 0.110 | −15 |
| | HUX-380 | Adeka Corporation | 0.150 | −27 |
| | WBR-016U | Taisei Fine Chemical Co., Ltd. | 0.210 | 20 |
| | W-5661 | Mitsui Chemicals, Inc. | 0.390 | 80 |
| Acrylic polymer particle dispersion | PDX-7480 | BASF | 0.072 | 100 |
| | PDX-7430 | BASF | 0.093 | 34 |
| | PDX-7326 | BASF | 0.226 | 9 |
| | PDX-7641 | BASF | 0.472 | 86 |
| | PDX-7696 | BASF | 0.909 | 86 |

<Surfactant>
(1) Fluorinated Surfactants Represented by General Formula (1)
(1-1) Fluorinated Surfactants Represented by the General Formula (1) and Having HLB of 11 or Less
F-444: Megaface F-444 (manufactured by DIC Corporation) [HLB: 8.5]
FSO: Zonyl FSO (manufactured by Du Pont) [HLB: 9.5]
FS-3100: Capstone FS-3100 (manufactured by Du Pont) [HLB: 9.8]
DSN403N: Unidyne DSN-403N (manufactured by Daikin Industries, Ltd.) [HLB: 10.0]
FS-30: Capstone FS-30 (manufactured by Du Pont) [HLB: 11.0] (1-2) Fluorinated surfactants represented by the general formula (1) and having HLB of more than 11
S-242: Surflon S-242 (manufactured by AGC Seimi Chemical Co., Ltd.) [HLB: 12.0]
S-243: Surflon S-243 (manufactured by AGC Seimi Chemical Co., Ltd.) [HLB: 15.0]
(2) Surfactants Other than General Formula (1)
(2-1) Fluorinated Surfactants Other than the General Formula (1)
Ftergent 250: Ftergent 250 (manufactured by NEOS Co. Ltd.) [HLB: 10.4]
(2-2) Surfactants Other than Fluorinated Surfactants
AE100: Acetylene glycol surfactant Acetylenol E100 (manufactured by Kawaken Fine Chemicals Co., Ltd.) [HLB: 16.3]

TABLE 2

Preparation Conditions for Inks

| | | | | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|---|---|---|
| Pigment | | | | 4.0 | 4.0 | 4.0 | 4.0 | 4.0 | 4.0 | 4.0 | 4.0 | 4.0 | 4.0 | 4.0 |
| Polymer particles | | SF-300 | 0.032 mmol/g | 1.0 | 1.0 | 1.0 | 1.0 | 1.0 | 1.0 | 1.0 | 1.0 | 1.0 | 1.0 | 1.0 |
| Surfactant | General formula (1) | F-444 | HLB: 8.5 | 1.0 | 1.0 | 1.0 | 1.0 | 1.0 | 1.0 | 0 | 0 | 0 | 0 | 0.5 |
| | | FSO | HLB: 9.5 | 0 | 0 | 0 | 0 | 0 | 0 | 1.0 | 0 | 0 | 0 | 0 |
| | | FS-3100 | HLB: 9.8 | 0 | 0 | 0 | 0 | 0 | 0 | 0 | 1.0 | 0 | 0 | 0 |
| | | DSN403N | HLB: 10.0 | 0 | 0 | 0 | 0 | 0 | 0 | 0 | 0 | 1.0 | 0 | 0 |
| | | FS-30 | HLB: 11.0 | 0 | 0 | 0 | 0 | 0 | 0 | 0 | 0 | 0 | 1.0 | 0.5 |
| | Other than general formula (1) | AE100 | HLB: 16.3 | 0 | 0 | 0 | 0 | 0 | 0 | 0 | 0 | 0 | 0 | 0 |
| Water-soluble organic solvent | Group A | Glycerin | | 20.0 | 0 | 0 | 0 | 0 | 0 | 20.0 | 20.0 | 20.0 | 20.0 | 5.0 |
| | | Ethylene glycol | | 0 | 20.0 | 0 | 0 | 0 | 0 | 0 | 0 | 0 | 0 | 5.0 |
| | | Diethylene glycol | | 0 | 0 | 20.0 | 0 | 0 | 0 | 0 | 0 | 0 | 0 | 5.0 |
| | | Poly(ethylene glycol) (molecular weight: 1000) | | 0 | 0 | 0 | 20.0 | 0 | 0 | 0 | 0 | 0 | 0 | 0 |
| | | 1,3-propanediol | | 0 | 0 | 0 | 0 | 20.0 | 0 | 0 | 0 | 0 | 0 | 0 |
| | | 1,4-butanediol | | 0 | 0 | 0 | 0 | 0 | 20.0 | 0 | 0 | 0 | 0 | 0 |
| | Other than group A | 2-methyl-1,3-propanediol | | 0 | 0 | 0 | 0 | 0 | 0 | 0 | 0 | 0 | 0 | 5.0 |
| | | N-methyl-2-pyrrolidone | | 0 | 0 | 0 | 0 | 0 | 0 | 0 | 0 | 0 | 0 | 0 |
| | | Trimethylolpropane | | 0 | 0 | 0 | 0 | 0 | 0 | 0 | 0 | 0 | 0 | 0 |
| Ion-exchanged water | | | | 74.0 | 74.0 | 74.0 | 74.0 | 74.0 | 74.0 | 74.0 | 74.0 | 74.0 | 74.0 | 74.0 |

TABLE 2-continued

Preparation Conditions for Inks (Unit: mass %)

| | | | | Ink 12 | Ink 13 | Ink 14 | Ink 15 | Ink 16 | Ink 17 | Ink 18 | Ink 19 | Ink 20 |
|---|---|---|---|---|---|---|---|---|---|---|---|---|
| Pigment | | | | 4.0 | 4.0 | 4.0 | 4.0 | 4.0 | 4.0 | 4.0 | 5.0 | 4.0 |
| Polymer particles | | SF-300 | 0.032 mmol/g | 1.0 | 1.0 | 1.0 | 1.0 | 1.0 | 1.0 | 1.0 | 1.0 | 0.8 |
| Surfactant | General formula (1) | F-444 | HLB: 8.5 | 0.5 | 1.0 | 0 | 0 | 0 | 1.0 | 1.0 | 1.0 | 1.0 |
| | | FSO | HLB: 9.5 | 0.5 | 0 | 0 | 0 | 0 | 0 | 0 | 0 | 0 |
| | | FS-3100 | HLB: 9.8 | 0 | 0 | 0 | 0 | 0 | 0 | 0 | 0 | 0 |
| | | DSN403N | HLB: 10.0 | 0 | 0 | 1.0 | 0 | 0 | 0 | 0 | 0 | 0 |
| | | FS-30 | HLB: 11.0 | 0 | 0 | 0 | 1.0 | 1.0 | 0 | 0 | 0 | 0 |
| | Other than general formula (1) | AE100 | HLB: 16.3 | 0 | 0 | 0 | 0 | 0 | 0.1 | 0.2 | 0 | 0 |
| Water-soluble organic solvent | Group A | Glycerin | | 5.0 | 0 | 10.0 | 15.0 | 10.0 | 20.0 | 20.0 | 20.0 | 20.0 |
| | | Ethylene glycol | | 0 | 0 | 0 | 0 | 0 | 0 | 0 | 0 | 0 |
| | | Diethylene glycol | | 0 | 5.0 | 5.0 | 0 | 0 | 0 | 0 | 0 | 0 |
| | | Poly(ethylene glycol) (molecular weight: 1000) | | 0 | 5.0 | 0 | 0 | 0 | 0 | 0 | 0 | 0 |
| | | 1,3-propanediol | | 5.0 | 0 | 0 | 0 | 0 | 0 | 0 | 0 | 0 |
| | | 1,4-butanediol | | 5.0 | 5.0 | 0 | 0 | 0 | 0 | 0 | 0 | 0 |
| | Other than group A | 2-methyl-1,3-propanediol | | 0 | 0 | 5.0 | 5.0 | 5.0 | 0 | 0 | 0 | 0 |
| | | N-methyl-2-pyrrolidone | | 0 | 5.0 | 0 | 0 | 0 | 0 | 0 | 0 | 0 |
| | | Trimethylolpropane | | 5.0 | 0 | 0 | 0 | 0 | 0 | 0 | 0 | 0 |
| Ion-exchanged water | | | | 74.0 | 74.0 | 74.0 | 74.0 | 79.0 | 73.9 | 73.8 | 73.0 | 74.2 |

TABLE 3

Preparation Conditions for Inks

| | | | | Ink 21 | Ink 22 | Ink 23 | Ink 24 | Ink 25 | Ink 26 | Ink 27 | Ink 28 | Ink 29 | Ink 30 | Ink 31 |
|---|---|---|---|---|---|---|---|---|---|---|---|---|---|---|
| Pigment | | | | 3.0 | 4.0 | 5.0 | 6.0 | 4.0 | 4.0 | 4.0 | 4.0 | 4.0 | 4.0 | 4.0 |
| Polymer particles | | SF-300 | 0.032 mmol/g | 7.5 | 8.0 | 5.0 | 6.0 | 1.0 | 1.0 | 1.0 | 1.0 | 1.0 | 1.0 | 1.0 |
| | | HUX-561 | 0.110 mmol/g | 0 | 0 | 0 | 0 | 0 | 0 | 0 | 0 | 0 | 0 | 0 |
| | | HUX-380 | 0.150 mmol/g | 0 | 0 | 0 | 0 | 0 | 0 | 0 | 0 | 0 | 0 | 0 |
| | | PDX-7480 | 0.072 mmol/g | 0 | 0 | 0 | 0 | 0 | 0 | 0 | 0 | 0 | 0 | 0 |
| Surfactant | General formula (1) | F-444 | HLB: 8.5 | 1.0 | 1.0 | 1.0 | 1.0 | 1.0 | 1.0 | 1.0 | 1.0 | 1.0 | 1.0 | 1.0 |
| Water-soluble organic solvent | Group A | Glycerin | | 20.0 | 20.0 | 20.0 | 20.0 | 20.0 | 20.0 | 20.0 | 20.0 | 20.0 | 20.0 | 20.0 |
| | | Ethylene glycol | | 0 | 0 | 0 | 0 | 0 | 0 | 0 | 0 | 0 | 0 | 0 |
| | | Diethylene glycol | | 0 | 0 | 0 | 0 | 0 | 0 | 0 | 0 | 0 | 0 | 0 |
| Additive agent | Group B | Humectant: Tetritol | | 0 | 0 | 0 | 0 | 7.0 | 0 | 0 | 0 | 0 | 0 | 0 |
| | | Humectant: Pentitol | | 0 | 0 | 0 | 0 | 0 | 7.0 | 0 | 0 | 0 | 0 | 0 |
| | | Humectant: Hexitol | | 0 | 0 | 0 | 0 | 0 | 0 | 7.0 | 0 | 0 | 0 | 0 |
| | | Humectant: Heptitol | | 0 | 0 | 0 | 0 | 0 | 0 | 0 | 7.0 | 0 | 0 | 0 |
| | | Humectant: Octitol | | 0 | 0 | 0 | 0 | 0 | 0 | 0 | 0 | 7.0 | 0 | 0 |
| | | Thickener: PEG (molecular weight: 20,000) | | 0 | 0 | 0 | 0 | 0 | 0 | 0 | 0 | 0 | 1.0 | 0 |
| | Other than group B | Humectant: Urea | | 0 | 0 | 0 | 0 | 0 | 0 | 0 | 0 | 0 | 0 | 7.0 |
| | | Humectant: N-methylmorpholine-N-oxide | | 0 | 0 | 0 | 0 | 0 | 0 | 0 | 0 | 0 | 0 | 0 |
| | | Thickener: Xanthan gum | | 0 | 0 | 0 | 0 | 0 | 0 | 0 | 0 | 0 | 0 | 0 |
| | | Thickener: Sodium alginate | | 0 | 0 | 0 | 0 | 0 | 0 | 0 | 0 | 0 | 0 | 0 |
| | | Thickener: Poly(vinyl alcohol) | | 0 | 0 | 0 | 0 | 0 | 0 | 0 | 0 | 0 | 0 | 0 |
| Ion-exchanged water | | | | 68.5 | 67.0 | 69.0 | 67.0 | 67.0 | 67.0 | 67.0 | 67.0 | 67.0 | 73.0 | 67.0 |

TABLE 3-continued

Preparation Conditions for Inks (Unit: mass %)

| | | | | Ink No. | | | | | | | | |
|---|---|---|---|---|---|---|---|---|---|---|---|---|
| | | | | | Ink 32 | Ink 33 | Ink 34 | Ink 35 | Ink 36 | Ink 37 | Ink 38 | Ink 39 | Ink 40 |
| Pigment | | | | | 4.0 | 4.0 | 4.0 | 4.0 | 4.0 | 4.0 | 4.0 | 4.0 | 4.0 |
| Polymer particles | | SF-300 | 0.032 mmol/g | | 1.0 | 1.0 | 1.0 | 1.0 | 0 | 0 | 0 | 0 | 0 |
| | | HUX-561 | 0.110 mmol/g | | 0 | 0 | 0 | 0 | 1.0 | 0 | 0 | 0 | 0 |
| | | HUX-380 | 0.150 mmol/g | | 0 | 0 | 0 | 0 | 0 | 1.0 | 0 | 0 | 0 |
| | | PDX-7480 | 0.072 mmol/g | | 0 | 0 | 0 | 0 | 0 | 0 | 1.0 | 1.0 | 1.0 |
| Surfactant | General formula (1) | F-444 | HLB: 8.5 | | 1.0 | 1.0 | 1.0 | 1.0 | 1.0 | 1.0 | 1.0 | 1.0 | 1.0 |
| Water-soluble organic solvent | Group A | Glycerin | | | 20.0 | 20.0 | 20.0 | 20.0 | 20.0 | 20.0 | 20.0 | 0 | 0 |
| | | Ethylene glycol | | | 0 | 0 | 0 | 0 | 0 | 0 | 0 | 20.0 | 0 |
| | | Diethylene glycol | | | 0 | 0 | 0 | 0 | 0 | 0 | 0 | 0 | 20.0 |
| Additive agent | Group B | Humectant: Tetritol | | | 0 | 0 | 0 | 0 | 0 | 0 | 0 | 0 | 0 |
| | | Humectant: Pentitol | | | 0 | 0 | 0 | 0 | 0 | 0 | 0 | 0 | 0 |
| | | Humectant: Hexitol | | | 0 | 0 | 0 | 0 | 0 | 0 | 0 | 0 | 0 |
| | | Humectant: Heptitol | | | 0 | 0 | 0 | 0 | 0 | 0 | 0 | 0 | 0 |
| | | Humectant: Octitol | | | 0 | 0 | 0 | 0 | 0 | 0 | 0 | 0 | 0 |
| | | Thickener: PEG (molecular weight: 20,000) | | | 0 | 0 | 0 | 0 | 0 | 0 | 0 | 0 | 0 |
| | Other than group B | Humectant: Urea | | | 0 | 0 | 0 | 0 | 0 | 0 | 0 | 0 | 0 |
| | | Humectant: N-methylmorpholine-N-oxide | | | 7.0 | 0 | 0 | 0 | 0 | 0 | 0 | 0 | 0 |
| | | Thickener: Xanthan gum | | | 0 | 0.01 | 0 | 0 | 0 | 0 | 0 | 0 | 0 |
| | | Thickener: Sodium alginate | | | 0 | 0 | 0.01 | 0 | 0 | 0 | 0 | 0 | 0 |
| | | Thickener: Poly(vinyl alcohol) | | | 0 | 0 | 0 | 0.01 | 0 | 0 | 0 | 0 | 0 |
| Ion-exchanged water | | | | | 67.0 | 73.99 | 73.99 | 73.99 | 74.0 | 74.0 | 74.0 | 74.0 | 74.0 |

TABLE 4

Preparation Conditions for Inks

| | | | | Ink No. | | | | | | | | | | | |
|---|---|---|---|---|---|---|---|---|---|---|---|---|---|---|---|
| | | | | Ink 41 | Ink 42 | Ink 43 | Ink 44 | Ink 45 | Ink 46 | Ink 47 | Ink 48 | Ink 49 | Ink 50 | Ink 51 |
| Pigment | | | | 4.0 | 4.0 | 4.0 | 4.0 | 4.0 | 4.0 | 4.0 | 4.0 | 4.0 | 4.0 | 4.0 |
| Polymer particles | | PDX-7480 | 0.072 mmol/g | 1.0 | 1.0 | 1.0 | 1.0 | 1.0 | 1.0 | 1.0 | 1.0 | 1.0 | 1.0 | 1.0 |
| Surfactant | General formula (1) | F-444 | HLB: 8.5 | 1.0 | 1.0 | 1.0 | 0 | 0 | 0 | 0 | 0.5 | 0.5 | 1.0 | 0 |
| | | FSO | HLB: 9.5 | 0 | 0 | 0 | 1.0 | 0 | 0 | 0 | 0.5 | 0.5 | 0 | 0 |
| | | FS-3100 | HLB: 9.8 | 0 | 0 | 0 | 0 | 1.0 | 0 | 0 | 0 | 0 | 0 | 0 |
| | | DSN403N | HLB: 10.0 | 0 | 0 | 0 | 0 | 0 | 1.0 | 0 | 0 | 0 | 0 | 1.0 |
| | | FS-30 | HLB: 11.0 | 0 | 0 | 0 | 0 | 0 | 0 | 1.0 | 0.5 | 0 | 0 | 0 |
| | | AE100 | HLB: 16.3 | 0 | 0 | 0 | 0 | 0 | 0 | 0 | 0 | 0 | 0 | 0 |
| Water-soluble organic solvent | Group A | Glycerin | | 0 | 0 | 0 | 20.0 | 20.0 | 20.0 | 20.0 | 5.0 | 5.0 | 0 | 10.0 |
| | | Ethylene glycol | | 0 | 0 | 0 | 0 | 0 | 0 | 0 | 5.0 | 0 | 0 | 0 |
| | | Diethylene glycol | | 0 | 0 | 0 | 0 | 0 | 0 | 0 | 5.0 | 0 | 5.0 | 5.0 |
| | | Poly(ethylene glycol) (molecular weight: 1000) | | 20.0 | 0 | 0 | 0 | 0 | 0 | 0 | 0 | 0 | 5.0 | 0 |
| | | 1,3-propanediol | | 0 | 20.0 | 0 | 0 | 0 | 0 | 0 | 0 | 5.0 | 0 | 0 |
| | | 1,4-butanediol | | 0 | 0 | 20.0 | 0 | 0 | 0 | 0 | 0 | 5.0 | 5.0 | 0 |
| | Other than group A | 2-methyl-1,3-propanediol | | 0 | 0 | 0 | 0 | 0 | 0 | 0 | 0 | 5.0 | 0 | 5.0 |
| | | N-methyl-2-pyrrolidone | | 0 | 0 | 0 | 0 | 0 | 0 | 0 | 0 | 0 | 5.0 | 0 |
| | | Trimethylolpropane | | 0 | 0 | 0 | 0 | 0 | 0 | 0 | 0 | 5.0 | 0 | 0 |
| Ion-exchanged water | | | | 74.0 | 74.0 | 74.0 | 74.0 | 74.0 | 74.0 | 74.0 | 74.0 | 74.0 | 74.0 | 74.0 |

(Unit: mass %)

| | | | | Ink No. | | | | | | | | | |
|---|---|---|---|---|---|---|---|---|---|---|---|---|---|
| | | | | Ink 52 | Ink 53 | Ink 54 | Ink 55 | Ink 56 | Ink 57 | Ink 58 | Ink 59 | Ink 60 |
| Pigment | | | | 4.0 | 4.0 | 4.0 | 4.0 | 4.0 | 4.0 | 5.0 | 4.0 | 3.0 |
| Polymer particles | | PDX-7480 | 0.072 mmol/g | 1.0 | 1.0 | 1.0 | 1.0 | 1.0 | 1.0 | 1.0 | 0.8 | 7.5 |

TABLE 4-continued

Preparation Conditions for Inks

| | | | | | | | | | | | | |
|---|---|---|---|---|---|---|---|---|---|---|---|---|
| Surfactant | General formula (1) | F-444 | HLB: 8.5 | 0 | 0 | 1.0 | 1.0 | 1.0 | 1.0 | 1.0 | 1.0 | 1.0 |
| | | FSO | HLB: 9.5 | 0 | 0 | 0 | 0 | 0 | 0 | 0 | 0 | 0 |
| | | FS-3100 | HLB: 9.8 | 0 | 0 | 0 | 0 | 0 | 0 | 0 | 0 | 0 |
| | | DSN403N | HLB: 10.0 | 0 | 0 | 0 | 0 | 0 | 0 | 0 | 0 | 0 |
| | | FS-30 | HLB: 11.0 | 1.0 | 1.0 | 0 | 0 | 0 | 0 | 0 | 0 | 0 |
| | | AE100 | HLB: 16.3 | 0 | 0 | 0 | 0 | 0.1 | 0.2 | 0 | 0 | 0 |
| Water-soluble organic solvent | Group A | Glycerin | | 15.0 | 10.0 | 5.0 | 10.0 | 20.0 | 20.0 | 20.0 | 20.0 | 20.0 |
| | | Ethylene glycol | | 0 | 0 | 0 | 0 | 0 | 0 | 0 | 0 | 0 |
| | | Diethylene glycol | | 0 | 0 | 0 | 0 | 0 | 0 | 0 | 0 | 0 |
| | | Poly(ethylene glycol) (molecular weight: 1000) | | 0 | 0 | 0 | 0 | 0 | 0 | 0 | 0 | 0 |
| | | 1,3-propanediol | | 0 | 0 | 0 | 0 | 0 | 0 | 0 | 0 | 0 |
| | | 1,4-butanediol | | 0 | 0 | 0 | 0 | 0 | 0 | 0 | 0 | 0 |
| | Other than group A | 2-methyl-1,3-propanediol | | 5.0 | 5.0 | 15.0 | 10.0 | 0 | 0 | 0 | 0 | 0 |
| | | N-methyl-2-pyrrolidone | | 0 | 0 | 0 | 0 | 0 | 0 | 0 | 0 | 0 |
| | | Trimethylolpropane | | 0 | 0 | 0 | 0 | 0 | 0 | 0 | 0 | 0 |
| Ion-exchanged water | | | | 74.0 | 79.0 | 74.0 | 74.0 | 73.9 | 73.8 | 73.0 | 74.2 | 68.5 |

TABLE 5

Preparation Conditions for Inks

| | | | | Ink 61 | Ink 62 | Ink 63 | Ink 64 | Ink 65 | Ink 66 | Ink 67 | Ink 68 | Ink 69 | Ink 70 | Ink 71 |
|---|---|---|---|---|---|---|---|---|---|---|---|---|---|---|
| Pigment | | | | 4.0 | 5.0 | 6.0 | 4.0 | 4.0 | 4.0 | 4.0 | 4.0 | 4.0 | 4.0 | 4.0 |
| Polymer particles | | PDX-7480 | 0.072 mmol/g | 8.0 | 5.0 | 6.0 | 1.0 | 1.0 | 1.0 | 1.0 | 1.0 | 1.0 | 1.0 | 1.0 |
| | | PDX-7430 | 0.093 mmol/g | 0 | 0 | 0 | 0 | 0 | 0 | 0 | 0 | 0 | 0 | 0 |
| Surfactant | General formula (1) | F-444 | HLB: 8.5 | 1.0 | 1.0 | 1.0 | 1.0 | 1.0 | 1.0 | 1.0 | 1.0 | 1.0 | 1.0 | 1.0 |
| Water-soluble organic solvent | Group A | Glycerin | | 20.0 | 20.0 | 20.0 | 20.0 | 20.0 | 20.0 | 20.0 | 20.0 | 20.0 | 20.0 | 20.0 |
| | Other than Group A | 2-methyl-1,3-propanediol | | 0 | 0 | 0 | 0 | 0 | 0 | 0 | 0 | 0 | 0 | 0 |
| Additive agent | Group B | Humectant: Tetritol | | 0 | 0 | 0 | 7.0 | 0 | 0 | 0 | 0 | 0 | 0 | 0 |
| | | Humectant: Pentitol | | 0 | 0 | 0 | 0 | 7.0 | 0 | 0 | 0 | 0 | 0 | 0 |
| | | Humectant: Hexitol | | 0 | 0 | 0 | 0 | 0 | 7.0 | 0 | 0 | 0 | 0 | 0 |
| | | Humectant: Heptitol | | 0 | 0 | 0 | 0 | 0 | 0 | 7.0 | 0 | 0 | 0 | 0 |
| | | Humectant: Octitol | | 0 | 0 | 0 | 0 | 0 | 0 | 0 | 7.0 | 0 | 0 | 0 |
| | | Thickener: PEG (molecular weight: 20,000) | | 0 | 0 | 0 | 0 | 0 | 0 | 0 | 0 | 1.0 | 0 | 0 |
| | Other than group B | Humectant: Urea | | 0 | 0 | 0 | 0 | 0 | 0 | 0 | 0 | 0 | 7.0 | 0 |
| | | Humectant: N-methylmorpholine-N-oxide | | 0 | 0 | 0 | 0 | 0 | 0 | 0 | 0 | 0 | 0 | 7.0 |
| | | Thickener: Xanthan gum | | 0 | 0 | 0 | 0 | 0 | 0 | 0 | 0 | 0 | 0 | 0 |
| | | Thickener: Sodium alginate | | 0 | 0 | 0 | 0 | 0 | 0 | 0 | 0 | 0 | 0 | 0 |
| | | Thickener: Poly(vinyl alcohol) | | 0 | 0 | 0 | 0 | 0 | 0 | 0 | 0 | 0 | 0 | 0 |
| Ion-exchanged water | | | | 67.0 | 69.0 | 67.0 | 67.0 | 67.0 | 67.0 | 67.0 | 67.0 | 73.0 | 67.0 | 67.0 |

(Unit: mass %)

| | | | | Ink 72 | Ink 73 | Ink 74 | Ink 75 | Ink 76 | Ink 77 | Ink 78 | Ink 79 | Ink 80 |
|---|---|---|---|---|---|---|---|---|---|---|---|---|
| Pigment | | | | 4.0 | 4.0 | 4.0 | 4.0 | 4.0 | 4.0 | 6.0 | 4.0 | 4.0 |
| Polymer particles | | PDX-7480 | 0.072 mmol/g | 1.0 | 1.0 | 1.0 | 0 | 1.0 | 1.0 | 7.0 | 1.0 | 1.0 |
| | | PDX-7430 | 0.093 mmol/g | 0 | 0 | 0 | 1.0 | 0 | 0 | 0 | 0 | 0 |
| Surfactant | General formula (1) | F-444 | HLB: 8.5 | 1.0 | 1.0 | 1.0 | 1.0 | 1.0 | 1.0 | 1.0 | 3.0 | 1.0 |
| Water-soluble organic solvent | Group A | Glycerin | | 20.0 | 20.0 | 20.0 | 20.0 | 5.0 | 10.0 | 20.0 | 20.0 | 20.0 |
| | Other than Group A | 2-methyl-1,3-propanediol | | 0 | 0 | 0 | 0 | 15.0 | 10.0 | 0 | 0 | 0 |
| Additive agent | Group B | Humectant: Tetritol | | 0 | 0 | 0 | 0 | 0 | 0 | 0 | 0 | 0 |
| | | Humectant: Pentitol | | 0 | 0 | 0 | 0 | 0 | 0 | 0 | 0 | 0 |
| | | Humectant: Hexitol | | 0 | 0 | 0 | 0 | 0 | 0 | 0 | 0 | 0 |
| | | Humectant: Heptitol | | 0 | 0 | 0 | 0 | 0 | 0 | 0 | 0 | 0 |

TABLE 5-continued

Preparation Conditions for Inks

| | | | | | | | | | | | |
|---|---|---|---|---|---|---|---|---|---|---|---|
| | Other than group B | Humectant: Octitol | 0 | 0 | 0 | 0 | 0 | 0 | 0 | 0 | 0 |
| | | Thickener: PEG (molecular weight: 20,000) | 0 | 0 | 0 | 0 | 0 | 0 | 0 | 0 | 0 |
| | | Humectant: Urea | 0 | 0 | 0 | 0 | 0 | 0 | 0 | 0 | 0 |
| | | Humectant: N-methylmorpholine-N-oxide | 0 | 0 | 0 | 0 | 0 | 0 | 0 | 0 | 0 |
| | | Thickener: Xanthan gum | 0.01 | 0 | 0 | 0 | 0 | 0 | 0 | 0 | 0 |
| | | Thickener: Sodium alginate | 0 | 0.01 | 0 | 0 | 0 | 0 | 0 | 0 | 0 |
| | | Thickener: Poly(vinyl alcohol) | 0 | 0 | 0.01 | 0 | 0 | 0 | 0 | 0 | 0 |
| Ion-exchanged water | | | 73.99 | 73.99 | 73.99 | 74.0 | 74.0 | 74.0 | 66.0 | 72.0 | 73.0 |

TABLE 6

Preparation Conditions for Inks

| | | | | Ink No. | | | | | | | | | | |
|---|---|---|---|---|---|---|---|---|---|---|---|---|---|---|
| | | | | Ink 81 | Ink 82 | Ink 83 | Ink 84 | Ink 85 | Ink 86 | Ink 87 | Ink 88 | Ink 89 | Ink 90 | Ink 91 |
| Pigment | | | | 4.0 | 4.0 | 4.0 | 4.0 | 4.0 | 4.0 | 4.0 | 4.0 | 4.0 | 4.0 | 4.0 |
| Polymer particles | | SF-300 | 0.032 mmol/g | 0 | 0 | 1.0 | 1.0 | 1.0 | 1.0 | 1.0 | 1.0 | 1.0 | 1.0 | 1.0 |
| | | WBR-016U | 0.210 mmol/g | 1.0 | 0 | 0 | 0 | 0 | 0 | 0 | 0 | 0 | 0 | 0 |
| | | W-5661 | 0.390 mmol/g | 0 | 1.0 | 0 | 0 | 0 | 0 | 0 | 0 | 0 | 0 | 0 |
| Surfactant | General formula (1) | F-444 | HLB: 8.5 | 1.0 | 1.0 | 0 | 0 | 0 | 0 | 1.0 | 1.0 | 1.0 | 1.0 | 1.0 |
| | | S-242 | HLB: 12.0 | 0 | 0 | 1.0 | 0 | 0 | 0 | 0 | 0 | 0 | 0 | 0 |
| | | S-243 | HLB: 15.0 | 0 | 0 | 0 | 1.0 | 0 | 0 | 0 | 0 | 0 | 0 | 0 |
| | Other than general formula (1) | Ftergent250 | HLB: 10.4 | 0 | 0 | 0 | 0 | 1.0 | 0 | 0 | 0 | 0 | 0 | 0 |
| | | AE100 | HLB: 16.3 | 0 | 0 | 0 | 0 | 0 | 1.0 | 0 | 0 | 0 | 0 | 0 |
| Water-soluble organic solvent | Group A | Glycerin | | 20.0 | 20.0 | 20.0 | 20.0 | 20.0 | 20.0 | 0 | 0 | 0 | 0 | 0 |
| | Other than Group A | 2-methyl-1,3-propanediol | | 0 | 0 | 0 | 0 | 0 | 0 | 20.0 | 0 | 0 | 0 | 0 |
| | | Diethylene glycol monobutyl ether | | 0 | 0 | 0 | 0 | 0 | 0 | 0 | 20.0 | 0 | 0 | 0 |
| | | 2-pyrrolidone | | 0 | 0 | 0 | 0 | 0 | 0 | 0 | 0 | 20.0 | 0 | 0 |
| | | N-methyl-2-pyrrolidone | | 0 | 0 | 0 | 0 | 0 | 0 | 0 | 0 | 0 | 20.0 | 0 |
| | | Hexylene glycol | | 0 | 0 | 0 | 0 | 0 | 0 | 0 | 0 | 0 | 0 | 20.0 |
| | | Trimethylolpropane | | 0 | 0 | 0 | 0 | 0 | 0 | 0 | 0 | 0 | 0 | 0 |
| | | 1,2-hexanediol | | 0 | 0 | 0 | 0 | 0 | 0 | 0 | 0 | 0 | 0 | 0 |
| Additive agent | Group B | Humectant: Tetritol | | 0 | 0 | 0 | 0 | 0 | 0 | 0 | 0 | 0 | 0 | 0 |
| | | Humectant: Pentitol | | 0 | 0 | 0 | 0 | 0 | 0 | 0 | 0 | 0 | 0 | 0 |
| | | Humectant: Hexitol | | 0 | 0 | 0 | 0 | 0 | 0 | 0 | 0 | 0 | 0 | 0 |
| Ion-exchanged water | | | | 74.0 | 74.0 | 74.0 | 74.0 | 74.0 | 74.0 | 74.0 | 74.0 | 74.0 | 74.0 | 74.0 |

(Unit: mass %)

| | | | | Ink No. | | | | | | | | |
|---|---|---|---|---|---|---|---|---|---|---|---|---|
| | | | | Ink 92 | Ink 93 | Ink 94 | Ink 95 | Ink 96 | Ink 97 | Ink 98 | Ink 99 | Ink 100 |
| Pigment | | | | 4.0 | 4.0 | 4.0 | 4.0 | 4.0 | 4.0 | 4.0 | 4.0 | 4.0 |
| Polymer particles | | SF-300 | 0.032 mmol/g | 1.0 | 1.0 | 1.0 | 1.0 | 1.0 | 1.0 | 1.0 | 1.0 | 1.0 |
| | | WBR-016U | 0.210 mmol/g | 0 | 0 | 0 | 0 | 0 | 0 | 0 | 0 | 0 |
| | | W-5661 | 0.390 mmol/g | 0 | 0 | 0 | 0 | 0 | 0 | 0 | 0 | 0 |
| Surfactant | General formula (1) | F-444 | HLB: 8.5 | 1.0 | 1.0 | 1.0 | 1.0 | 1.0 | 1.0 | 0 | 0 | 0 |
| | | S-242 | HLB: 12.0 | 0 | 0 | 0 | 0 | 0 | 0 | 1.0 | 0 | 0 |
| | | S-243 | HLB: 15.0 | 0 | 0 | 0 | 0 | 0 | 0 | 0 | 1.0 | 0 |
| | Other than general formula (1) | Ftergent250 | HLB: 10.4 | 0 | 0 | 0 | 0 | 0 | 0 | 0 | 0 | 1.0 |
| | | AE100 | HLB: 16.3 | 0 | 0 | 0 | 0 | 0 | 0 | 0 | 0 | 0 |
| Water-soluble organic solvent | Group A | Glycerin | | 0 | 0 | 0 | 0 | 0 | 0 | 20.0 | 20.0 | 20.0 |
| | Other than Group A | 2-methyl-1,3-propanediol | | 0 | 0 | 10.0 | 0 | 0 | 5.0 | 0 | 0 | 0 |
| | | Diethylene glycol monobutyl ether | | 0 | 0 | 0 | 5.0 | 0 | 0 | 0 | 0 | 0 |
| | | 2-pyrrolidone | | 0 | 0 | 10.0 | 0 | 10.0 | 5.0 | 0 | 0 | 0 |
| | | N-methyl-2-pyrrolidone | | 0 | 0 | 0 | 5.0 | 0 | 0 | 0 | 0 | 0 |
| | | Hexylene glycol | | 0 | 0 | 0 | 5.0 | 10.0 | 5.0 | 0 | 0 | 0 |

TABLE 6-continued

| | | Preparation Conditions for Inks | | | | | | | | |
|---|---|---|---|---|---|---|---|---|---|---|
| | | Trimethylolpropane | 20.0 | 0 | 0 | 5.0 | 0 | 0 | 0 | 0 | 0 |
| | | 1,2-hexanediol | 0 | 20.0 | 0 | 0 | 0 | 5.0 | 0 | 0 | 0 |
| Additive agent | Group B | Humectant: Tetritol | 0 | 0 | 0 | 0 | 0 | 0 | 7.0 | 0 | 0 |
| | | Humectant: Pentitol | 0 | 0 | 0 | 0 | 0 | 0 | 0 | 7.0 | 0 |
| | | Humectant: Hexitol | 0 | 0 | 0 | 0 | 0 | 0 | 0 | 0 | 7.0 |
| Ion-exchanged water | | | 74.0 | 74.0 | 74.0 | 74.0 | 74.0 | 74.0 | 67.0 | 67.0 | 67.0 |

TABLE 7

Preparation Conditions for Inks

| | | | | Ink No. | | | | | | | | | | |
|---|---|---|---|---|---|---|---|---|---|---|---|---|---|---|
| | | | | Ink 101 | Ink 102 | Ink 103 | Ink 104 | Ink 105 | Ink 106 | Ink 107 | Ink 108 | Ink 109 | Ink 110 | Ink 111 |
| Pigment | | | | 4.0 | 4.0 | 4.0 | 4.0 | 4.0 | 4.0 | 4.0 | 4.0 | 4.0 | 4.0 | 4.0 |
| Polymer particles | | SF-300 | 0.032 mmol/g | 1.0 | 1.0 | 1.0 | 1.0 | 1.0 | 1.0 | 1.0 | 1.0 | 0.5 | 0.0 | 0 |
| | | PDX-7480 | 0.072 mmol/g | 0 | 0 | 0 | 0 | 0 | 0 | 0 | 0 | 0 | 0 | 0 |
| | | PDX-7326 | 0.226 mmol/g | 0 | 0 | 0 | 0 | 0 | 0 | 0 | 0 | 0 | 0 | 1.0 |
| | | PDX-7641 | 0.472 mmol/g | 0 | 0 | 0 | 0 | 0 | 0 | 0 | 0 | 0 | 0 | 0 |
| | | PDX-7696 | 0.909 mmol/g | 0 | 0 | 0 | 0 | 0 | 0 | 0 | 0 | 0 | 0 | 0 |
| Surfactant | General formula (1) | F-444 | HLB: 8.5 | 0 | 0 | 0 | 0 | 0 | 0 | 0 | 0 | 0 | 1.0 | 1.0 |
| | | S-242 | HLB: 12.0 | 0 | 1.0 | 0 | 0 | 1.0 | 0 | 0 | 0 | 1.0 | 0 | 0 |
| | | S-243 | HLB: 15.0 | 0 | 0 | 1.0 | 0 | 0 | 1.0 | 0 | 0 | 0 | 0 | 0 |
| | Other than general formula (1) | Ftergent250 | HLB: 10.4 | 0 | 0 | 0 | 1.0 | 0 | 0 | 1.0 | 0 | 0 | 0 | 0 |
| | | AE100 | HLB: 16.3 | 1.0 | 0 | 0 | 0 | 0 | 0 | 0 | 1.0 | 0 | 0 | 0 |
| Water-soluble organic solvent | Group A | Glycerin | | 20.0 | 20.0 | 20.0 | 20.0 | 20.0 | 20.0 | 20.0 | 20.0 | 5.0 | 20.0 | 20.0 |
| | | Diethylene glycol | | 0 | 0 | 0 | 0 | 0 | 0 | 0 | 0 | 5.0 | 0 | 0 |
| | Other than group A | 2-methyl-1,3-propanediol | | 0 | 0 | 0 | 0 | 0 | 0 | 0 | 0 | 10.0 | 0 | 0 |
| | | Diethylene glycol monobutyl ether | | 0 | 0 | 0 | 0 | 0 | 0 | 0 | 0 | 0 | 0 | 0 |
| | | 2-pyrrolidone | | 0 | 0 | 0 | 0 | 0 | 0 | 0 | 0 | 0 | 0 | 0 |
| Additive agent | Group B | Humectant: Tetritol | | 0 | 0 | 0 | 0 | 0 | 0 | 0 | 0 | 7.0 | 7.0 | 0 |
| | | Humectant: Heptitol | | 7.0 | 0 | 0 | 0 | 0 | 0 | 0 | 0 | 0 | 0 | 0 |
| | | Humectant: Octitol | | 0 | 7.0 | 0 | 0 | 0 | 0 | 0 | 0 | 0 | 0 | 0 |
| | | Thickener: PEG (molecular weight: 20,000) | | 0 | 0 | 1.0 | 0 | 0 | 0 | 0 | 0 | 0 | 0 | 0 |
| | Other than group B | Humectant: Urea | | 0 | 0 | 0 | 7.0 | 0 | 0 | 0 | 0 | 0 | 0 | 0 |
| | | Humectant: N-methylmorpholine-N-oxide | | 0 | 0 | 0 | 0 | 7.0 | 0 | 0 | 0 | 0 | 0 | 0 |
| | | Thickener: Xanthan gum | | 0 | 0 | 0 | 0 | 0 | 0.01 | 0 | 0 | 0 | 0 | 0 |
| | | Thickener: Sodium alginate | | 0 | 0 | 0 | 0 | 0 | 0 | 0.01 | 0 | 0 | 0 | 0 |
| | | Thickener: Poly(vinyl alcohol) | | 0 | 0 | 0 | 0 | 0 | 0 | 0 | 0.01 | 0 | 0 | 0 |
| Ion-exchanged water | | | | 67.0 | 67.0 | 73.0 | 67.0 | 67.0 | 73.99 | 73.99 | 73.99 | 67.5 | 68.0 | 74.0 |

(Unit: mass %)

| | | | | Ink No. | | | | | | | | |
|---|---|---|---|---|---|---|---|---|---|---|---|---|
| | | | | Ink 112 | Ink 113 | Ink 114 | Ink 115 | Ink 116 | Ink 117 | Ink 118 | Ink 119 | Ink 120 |
| Pigment | | | | 4.0 | 4.0 | 4.0 | 4.0 | 4.0 | 4.0 | 4.0 | 4.0 | 4.0 |
| Polymer particles | | SF-300 | 0.032 mmol/g | 0 | 0 | 0 | 0 | 0 | 0 | 0 | 0 | 0 |
| | | PDX-7480 | 0.072 mmol/g | 0 | 0 | 1.0 | 1.0 | 1.0 | 1.0 | 1.0 | 1.0 | 1.0 |
| | | PDX-7326 | 0.226 mmol/g | 0 | 0 | 0 | 0 | 0 | 0 | 0 | 0 | 0 |
| | | PDX-7641 | 0.472 mmol/g | 1.0 | 0 | 0 | 0 | 0 | 0 | 0 | 0 | 0 |
| | | PDX-7696 | 0.909 mmol/g | 0 | 1.0 | 0 | 0 | 0 | 0 | 0 | 0 | 0 |
| Surfactant | General formula (1) | F-444 | HLB: 8.5 | 1.0 | 1.0 | 0 | 0 | 0 | 0 | 1.0 | 1.0 | 1.0 |
| | | S-242 | HLB: 12.0 | 0 | 0 | 1.0 | 0 | 0 | 0 | 0 | 0 | 0 |
| | | S-243 | HLB: 15.0 | 0 | 0 | 0 | 1.0 | 0 | 0 | 0 | 0 | 0 |
| | Other than general formula (1) | Ftergent250 | HLB: 10.4 | 0 | 0 | 0 | 0 | 1.0 | 0 | 0 | 0 | 0 |
| | | AE100 | HLB: 16.3 | 0 | 0 | 0 | 0 | 0 | 1.0 | 0 | 0 | 0 |
| Water-soluble | Group A | Glycerin | | 20.0 | 20.0 | 20.0 | 20.0 | 20.0 | 20.0 | 0 | 0 | 0 |
| | | Diethylene glycol | | 0 | 0 | 0 | 0 | 0 | 0 | 0 | 0 | 0 |

TABLE 7-continued

Preparation Conditions for Inks

| | | | | | | | | | | | |
|---|---|---|---|---|---|---|---|---|---|---|---|
| organic solvent | Other than group A | 2-methyl-1,3-propanediol | 0 | 0 | 0 | 0 | 0 | 0 | 20.0 | 0 | 0 |
| | | Diethylene glycol monobutyl ether | 0 | 0 | 0 | 0 | 0 | 0 | 0 | 20.0 | 0 |
| | | 2-pyrrolidone | 0 | 0 | 0 | 0 | 0 | 0 | 0 | 0 | 20.0 |
| Additive agent | Group B | Humectant: Tetritol | 0 | 0 | 0 | 0 | 0 | 0 | 0 | 0 | 0 |
| | | Humectant: Heptitol | 0 | 0 | 0 | 0 | 0 | 0 | 0 | 0 | 0 |
| | | Humectant: Octitol | 0 | 0 | 0 | 0 | 0 | 0 | 0 | 0 | 0 |
| | | Thickener: PEG (molecular weight: 20,000) | 0 | 0 | 0 | 0 | 0 | 0 | 0 | 0 | 0 |
| | Other than group B | Humectant: Urea | 0 | 0 | 0 | 0 | 0 | 0 | 0 | 0 | 0 |
| | | Humectant: N-methylmorpholine-N-oxide | 0 | 0 | 0 | 0 | 0 | 0 | 0 | 0 | 0 |
| | | Thickener: Xanthan gum | 0 | 0 | 0 | 0 | 0 | 0 | 0 | 0 | 0 |
| | | Thickener: Sodium alginate | 0 | 0 | 0 | 0 | 0 | 0 | 0 | 0 | 0 |
| | | Thickener: Poly(vinyl alcohol) | 0 | 0 | 0 | 0 | 0 | 0 | 0 | 0 | 0 |
| Ion-exchanged water | | | 74.0 | 74.0 | 74.0 | 74.0 | 74.0 | 74.0 | 74.0 | 74.0 | 74.0 |

TABLE 8

Preparation Conditions for Inks

| | | | | Ink No. | | | | | | | | | | |
|---|---|---|---|---|---|---|---|---|---|---|---|---|---|---|
| | | | | Ink 121 | Ink 122 | Ink 123 | Ink 124 | Ink 125 | Ink 126 | Ink 127 | Ink 128 | Ink 129 | Ink 130 | Ink 131 |
| Pigment | | | | 4.0 | 4.0 | 4.0 | 4.0 | 4.0 | 4.0 | 4.0 | 4.0 | 4.0 | 4.0 | 4.0 |
| Polymer particles | | PDX-7480 | 0.072 mmol/g | 1.0 | 1.0 | 1.0 | 1.0 | 1.0 | 1.0 | 1.0 | 1.0 | 1.0 | 1.0 | 1.0 |
| Surfactant | General formula (1) | F-444 | HLB: 8.5 | 1.0 | 1.0 | 1.0 | 1.0 | 1.0 | 1.0 | 1.0 | 1.0 | 0 | 0 | 0 |
| | | S-242 | HLB: 12.0 | 0 | 0 | 0 | 0 | 0 | 0 | 0 | 0 | 1.0 | 0 | 0 |
| | | S-243 | HLB: 15.0 | 0 | 0 | 0 | 0 | 0 | 0 | 0 | 0 | 0 | 1.0 | 0 |
| | Other than general formula (1) | Ftergent250 | HLB: 10.4 | 0 | 0 | 0 | 0 | 0 | 0 | 0 | 0 | 0 | 0 | 1.0 |
| | | AE100 | HLB: 16.3 | 0 | 0 | 0 | 0 | 0 | 0 | 0 | 0 | 0 | 0 | 0 |
| Water-soluble organic solvent | Group A | Glycerin | | 0 | 0 | 0 | 0 | 0 | 0 | 0 | 0 | 20.0 | 20.0 | 20.0 |
| | | Diethylene glycol | | 0 | 0 | 0 | 0 | 0 | 0 | 0 | 0 | 0 | 0 | 0 |
| | Other than group A | 2-methyl-1,3-propanediol | | 0 | 0 | 0 | 0 | 10.0 | 0 | 0 | 5.0 | 0 | 0 | 0 |
| | | Diethylene glycol monobutyl ether | | 0 | 0 | 0 | 0 | 0 | 5.0 | 0 | 0 | 0 | 0 | 0 |
| | | 2-pyrrolidone | | 0 | 0 | 0 | 0 | 10.0 | 0 | 10.0 | 5.0 | 0 | 0 | 0 |
| | | N-methyl-2-pyrrolidone | | 20.0 | 0 | 0 | 0 | 0 | 5.0 | 0 | 0 | 0 | 0 | 0 |
| | | Hexylene glycol | | 0 | 20.0 | 0 | 0 | 0 | 5.0 | 10.0 | 5.0 | 0 | 0 | 0 |
| | | Trimethylolpropane | | 0 | 0 | 20.0 | 0 | 0 | 5.0 | 0 | 0 | 0 | 0 | 0 |
| | | 1,2-hexanediol | | 0 | 0 | 0 | 20.0 | 0 | 0 | 0 | 5.0 | 0 | 0 | 0 |
| Additive agent | Group B | Humectant: Tetritol | | 0 | 0 | 0 | 0 | 0 | 0 | 0 | 0 | 7.0 | 0 | 0 |
| | | Humectant: Pentitol | | 0 | 0 | 0 | 0 | 0 | 0 | 0 | 0 | 0 | 7.0 | 0 |
| | | Humectant: Hexitol | | 0 | 0 | 0 | 0 | 0 | 0 | 0 | 0 | 0 | 0 | 7.0 |
| | | Humectant: Heptitol | | 0 | 0 | 0 | 0 | 0 | 0 | 0 | 0 | 0 | 0 | 0 |
| | | Humectant: Octitol | | 0 | 0 | 0 | 0 | 0 | 0 | 0 | 0 | 0 | 0 | 0 |
| | | Thickener: PEG (molecular weight: 20,000) | | 0 | 0 | 0 | 0 | 0 | 0 | 0 | 0 | 0 | 0 | 0 |
| | Other than group B | Humectant: Urea | | 0 | 0 | 0 | 0 | 0 | 0 | 0 | 0 | 0 | 0 | 0 |
| | | Humectant: N-methylmorpholine-N-oxide | | 0 | 0 | 0 | 0 | 0 | 0 | 0 | 0 | 0 | 0 | 0 |
| | | Thickener: Xanthan gum | | 0 | 0 | 0 | 0 | 0 | 0 | 0 | 0 | 0 | 0 | 0 |
| | | Thickener: Sodium alginate | | 0 | 0 | 0 | 0 | 0 | 0 | 0 | 0 | 0 | 0 | 0 |
| | | Thickener: Poly(vinyl alcohol) | | 0 | 0 | 0 | 0 | 0 | 0 | 0 | 0 | 0 | 0 | 0 |
| Ion-exchanged water | | | | 74.0 | 74.0 | 74.0 | 74.0 | 74.0 | 74.0 | 74.0 | 74.0 | 67.0 | 67.0 | 67.0 |

TABLE 8-continued

Preparation Conditions for Inks (Unit: mass %)

| | | | | Ink 132 | Ink 133 | Ink 134 | Ink 135 | Ink 136 | Ink 137 | Ink 138 | Ink 139 | Ink 140 |
|---|---|---|---|---|---|---|---|---|---|---|---|---|
| Pigment | | | | 4.0 | 4.0 | 4.0 | 4.0 | 4.0 | 4.0 | 4.0 | 4.0 | 4.0 |
| Polymer particles | | PDX-7480 | 0.072 mmol/g | 1.0 | 1.0 | 1.0 | 1.0 | 1.0 | 1.0 | 1.0 | 1.0 | 0.5 |
| Surfactant | General formula (1) | F-444 | HLB: 8.5 | 0 | 0 | 0 | 0 | 0 | 0 | 0 | 0 | 0 |
| | | S-242 | HLB: 12.0 | 0 | 1.0 | 0 | 0 | 1.0 | 0 | 0 | 0 | 1.0 |
| | | S-243 | HLB: 15.0 | 0 | 0 | 1.0 | 0 | 0 | 1.0 | 0 | 0 | 0 |
| | Other than general formula (1) | Ftergent250 | HLB: 10.4 | 0 | 0 | 0 | 1.0 | 0 | 0 | 1.0 | 0 | 0 |
| | | AE100 | HLB: 16.3 | 1.0 | 0 | 0 | 0 | 0 | 0 | 0 | 1.0 | 0 |
| Water-soluble organic solvent | Group A | Glycerin | | 20.0 | 20.0 | 20.0 | 20.0 | 20.0 | 20.0 | 20.0 | 20.0 | 5.0 |
| | | Diethylene glycol | | 0 | 0 | 0 | 0 | 0 | 0 | 0 | 0 | 5.0 |
| | Other than group A | 2-methyl-1,3-propanediol | | 0 | 0 | 0 | 0 | 0 | 0 | 0 | 0 | 10.0 |
| | | Diethylene glycol monobutyl ether | | 0 | 0 | 0 | 0 | 0 | 0 | 0 | 0 | 0 |
| | | 2-pyrrolidone | | 0 | 0 | 0 | 0 | 0 | 0 | 0 | 0 | 0 |
| | | N-methyl-2-pyrrolidone | | 0 | 0 | 0 | 0 | 0 | 0 | 0 | 0 | 0 |
| | | Hexylene glycol | | 0 | 0 | 0 | 0 | 0 | 0 | 0 | 0 | 0 |
| | | Trimethylolpropane | | 0 | 0 | 0 | 0 | 0 | 0 | 0 | 0 | 0 |
| | | 1,2-hexanediol | | 0 | 0 | 0 | 0 | 0 | 0 | 0 | 0 | 0 |
| Additive agent | Group B | Humectant: Tetritol | | 0 | 0 | 0 | 0 | 0 | 0 | 0 | 0 | 7.0 |
| | | Humectant: Pentitol | | 0 | 0 | 0 | 0 | 0 | 0 | 0 | 0 | 0 |
| | | Humectant: Hexitol | | 0 | 0 | 0 | 0 | 0 | 0 | 0 | 0 | 0 |
| | | Humectant: Heptitol | | 7.0 | 0 | 0 | 0 | 0 | 0 | 0 | 0 | 0 |
| | | Humectant: Octitol | | 0 | 7.0 | 0 | 0 | 0 | 0 | 0 | 0 | 0 |
| | | Thickener: PEG (molecular weight: 20,000) | | 0 | 0 | 1.0 | 0 | 0 | 0 | 0 | 0 | 0 |
| | Other than group B | Humectant: Urea | | 0 | 0 | 0 | 7.0 | 0 | 0 | 0 | 0 | 0 |
| | | Humectant: N-methylmorpholine-N-oxide | | 0 | 0 | 0 | 0 | 7.0 | 0 | 0 | 0 | 0 |
| | | Thickener: Xanthan gum | | 0 | 0 | 0 | 0 | 0 | 0.01 | 0 | 0 | 0 |
| | | Thickener: Sodium alginate | | 0 | 0 | 0 | 0 | 0 | 0 | 0.01 | 0 | 0 |
| | | Thickener: Poly(vinyl alcohol) | | 0 | 0 | 0 | 0 | 0 | 0 | 0 | 0.01 | 0 |
| Ion-exchanged water | | | | 67.0 | 67.0 | 73.0 | 67.0 | 67.0 | 73.99 | 73.99 | 73.99 | 67.5 |

[Preparation of Image Samples]

A 3 cm×3 cm solid image (recording duty: 100%) was recorded on a recording medium OK Prince High Quality (basis weight: 64 g/m$^2$) (manufactured by Oji Paper Co., Ltd.) using an ink jet recording apparatus equipped with a piezoelectric ink jet head KJ4 (manufactured by Kyocera Corporation, nozzle density: 600 dpi) illustrated in FIG. 1 under the conditions listed in Tables 6 and 7 (the type of ink used, the surface temperature of the recording medium to which an ink is applied, and tension applied to the recording medium with a tension-applying unit) (image sample 1). Three lines each having a width of 3 mm and one line having a width of 17 mm (recording duty for each line: 100%) were recorded in parallel on a recording medium DL9084 (basis weight: 91 g/m$^2$) (manufactured by Mitsubishi Paper Mills, Ltd.) (image sample 2). The recording conditions included a temperature of 25° C., a relative humidity of 55%, an ink ejection frequency of 39 kHz, a recording medium transfer speed of 100 m/s, and an ink ejection volume of approximately 13 pl per dot during recording. In the tables, "-" in the column of "Tension applied to recording medium" means that no particular tension other than tension resulting from conveyance was applied to the recording medium with the tension-applying unit. A recording duty of 100% for the ink jet recording apparatus refers to the conditions where one dot of ink (13 ng) was applied to a unit area of 1/600 inches×1/600 inches at a resolution of 600 dpi×600 dpi. The surface temperature of the recording medium to which an ink was applied was measured with a noncontact infrared thermometer digital radiation temperature sensor FT-H20 (manufactured by Keyence Corporation) at a position generally vertically separated by 10 cm from a surface of the recording medium.

[Evaluation]

Of the evaluation criteria for the following evaluation items, AA to B represent acceptable levels, and C represents an unacceptable level.

<Optical Density of Images>

The optical density of the image sample 1 was measured with a reflection densitometer RD19I (manufactured by GretagMacbeth). The optical density of images was rated according to the following criteria. Tables 9 to 12 show the results.

AA: The optical density was 1.0 or more.
A: The optical density was 0.9 or more and less than 1.0.
B: The optical density was 0.8 or more and less than 0.9.
C: The optical density was less than 0.8.

<Scratch Resistance of Images>

Within 3 minutes of the image sample 2 being recorded, a sheet of OK Top Coat+(basis weight: 105 g/m$^2$) (manufactured by Oji Paper Co., Ltd.) was placed on the image sample 2, and a 500-g weight was placed on the sheet. The contact area between the 500-g weight and the sheet was 12.6 cm². A scratch resistance test was performed by moving the OK Top Coat+ sheet once at a speed of 10 cm/s relative to the image sample 2. The weight crossed the four lines recorded on the image sample 2 at right angles. Ink that adhered to the 12.6-cm² area of the OK Top Coat+ on which the weight was placed was read with a scanner (multifunction device iR3245F (manufactured by CANON KABUSHIKI KAISHA), 600 dpi, gray scale, photograph mode). The percentage of area of less than 128 out of 256 tones (the percentage of an ink adhesion area) was determined. The scratch resistance of images was rated according to the following criteria. Tables 9 to 12 show the results.

AA: The percentage of the ink adhesion area was 1% or less.
A: The percentage of the ink adhesion area was more than 1% and 3% or less.
B: The percentage of the ink adhesion area was more than 3% and 5% or less.
C: The percentage of the ink adhesion area was more than 5%.

[Evaluation of Ejection Stability]

A yellow ink tank of an ink jet printer PX-205 (manufactured by Seiko Epson Corporation) was charged with an ink. An A4-size yellow image ($\{R, G, B\}=\{255, 255, 0\}$ on a RGB 256 gray scale) of standard print quality was continuously printed on 10 sheets to prepare image samples. The image samples were visually inspected and were rated according to the following criteria for ejection stability. Tables 9 to 12 show the results.

A: Streaks and unevenness of color were not observed on the 10 image samples.
B: Streaks and unevenness of color were observed on some of the image samples.

TABLE 9

Recording Conditions and Evaluation Results

| Embodiment No. | Ink No. | Recording conditions | | Evaluation results | | |
| --- | --- | --- | --- | --- | --- | --- |
| | | Surface temperature of recording medium to which ink is applied (° C.) | Tension applied to recording medium (N/m) | Optical density of images | Scratch resistance of images | Ejection stability |
| Exemplary embodiment 1 | Ink 1 | 25 | — | A | A | B |
| Exemplary embodiment 2 | Ink 1 | 70 | — | AA | A | B |
| Exemplary embodiment 3 | Ink 1 | 25 | 20 | AA | A | B |
| Exemplary embodiment 4 | Ink 2 | 25 | — | A | A | B |
| Exemplary embodiment 5 | Ink 3 | 25 | — | A | A | B |
| Exemplary embodiment 6 | Ink 4 | 25 | — | A | A | B |
| Exemplary embodiment 7 | Ink 5 | 25 | — | A | A | B |
| Exemplary embodiment 8 | Ink 6 | 25 | — | A | A | B |
| Exemplary embodiment 9 | Ink 7 | 25 | — | A | A | B |
| Exemplary embodiment 10 | Ink 8 | 25 | — | A | A | B |
| Exemplary embodiment 11 | Ink 9 | 25 | — | A | A | B |
| Exemplary embodiment 12 | Ink 10 | 25 | — | A | A | B |
| Exemplary embodiment 13 | Ink 11 | 25 | — | B | A | B |
| Exemplary embodiment 14 | Ink 12 | 25 | — | B | A | B |
| Exemplary embodiment 15 | Ink 13 | 25 | — | B | A | B |
| Exemplary embodiment 16 | Ink 14 | 25 | — | B | A | B |
| Exemplary embodiment 17 | Ink 15 | 25 | — | B | A | B |
| Exemplary embodiment 18 | Ink 16 | 25 | — | B | A | B |
| Exemplary embodiment 19 | Ink 17 | 25 | — | A | A | B |
| Exemplary embodiment 20 | Ink 18 | 25 | — | B | A | B |
| Exemplary embodiment 21 | Ink 19 | 25 | — | B | A | B |
| Exemplary embodiment 22 | Ink 20 | 25 | — | A | B | B |
| Exemplary embodiment 23 | Ink 21 | 25 | — | A | B | B |
| Exemplary embodiment 24 | Ink 22 | 25 | — | A | AA | B |
| Exemplary embodiment 25 | Ink 23 | 25 | — | A | A | B |
| Exemplary embodiment 26 | Ink 24 | 25 | — | A | AA | B |
| Exemplary embodiment 27 | Ink 25 | 25 | — | A | A | A |
| Exemplary embodiment 28 | Ink 26 | 25 | — | A | A | A |
| Exemplary embodiment 29 | Ink 27 | 25 | — | A | A | A |
| Exemplary embodiment 30 | Ink 28 | 25 | — | A | A | A |
| Exemplary embodiment 31 | Ink 29 | 25 | — | A | A | A |
| Exemplary embodiment 32 | Ink 30 | 25 | — | A | A | A |
| Exemplary embodiment 33 | Ink 31 | 25 | — | B | A | A |
| Exemplary embodiment 34 | Ink 32 | 25 | — | B | A | A |
| Exemplary embodiment 35 | Ink 33 | 25 | — | B | A | A |
| Exemplary embodiment 36 | Ink 34 | 25 | — | B | A | A |
| Exemplary embodiment 37 | Ink 35 | 25 | — | B | A | A |
| Exemplary embodiment 38 | Ink 36 | 25 | — | A | A | B |
| Exemplary embodiment 39 | Ink 37 | 25 | — | A | A | B |

TABLE 10

Recodring Conditions and Evaluation Results

| | | Recording conditions | | Evaluation results | | |
|---|---|---|---|---|---|---|
| | | Surface temperature of | Tension applied to | | | |
| Embodiment No. | Ink No. | recording medium to which ink is applied (° C.) | recording medium (N/m) | Optical density of images | Scratch resistance of images | Ejection stability |
| Exemplary embodiment 40 | Ink 38 | 25 | — | A | A | B |
| Exemplary embodiment 41 | Ink 38 | 70 | — | AA | A | B |
| Exemplary embodiment 42 | Ink 38 | 25 | 20 | AA | A | B |
| Exemplary embodiment 43 | Ink 39 | 25 | — | A | A | B |
| Exemplary embodiment 44 | Ink 40 | 25 | — | A | A | B |
| Exemplary embodiment 45 | Ink 41 | 25 | — | A | A | B |
| Exemplary embodiment 46 | Ink 42 | 25 | — | A | A | B |
| Exemplary embodiment 47 | Ink 43 | 25 | — | A | A | B |
| Exemplary embodiment 48 | Ink 44 | 25 | — | A | A | B |
| Exemplary embodiment 49 | Ink 45 | 25 | — | A | A | B |
| Exemplary embodiment 50 | Ink 46 | 25 | — | A | A | B |
| Exemplary embodiment 51 | Ink 47 | 25 | — | A | A | B |
| Exemplary embodiment 52 | Ink 48 | 25 | — | B | A | B |
| Exemplary embodiment 53 | Ink 49 | 25 | — | B | A | B |
| Exemplary embodiment 54 | Ink 50 | 25 | — | B | A | B |
| Exemplary embodiment 55 | Ink 51 | 25 | — | B | A | B |
| Exemplary embodiment 56 | Ink 52 | 25 | — | B | A | B |
| Exemplary embodiment 57 | Ink 53 | 25 | — | B | A | B |
| Exemplary embodiment 58 | Ink 54 | 25 | — | B | A | B |
| Exemplary embodiment 59 | Ink 55 | 25 | — | B | A | B |
| Exemplary embodiment 60 | Ink 56 | 25 | — | A | A | B |
| Exemplary embodiment 61 | Ink 57 | 25 | — | B | A | B |
| Exemplary embodiment 62 | Ink 58 | 25 | — | B | A | B |
| Exemplary embodiment 63 | Ink 59 | 25 | — | A | B | B |
| Exemplary embodiment 64 | Ink 60 | 25 | — | A | B | B |
| Exemplary embodiment 65 | Ink 61 | 25 | — | A | AA | B |
| Exemplary embodiment 66 | Ink 62 | 25 | — | A | A | B |
| Exemplary embodiment 67 | Ink 63 | 25 | — | A | AA | B |
| Exemplary embodiment 68 | Ink 64 | 25 | — | A | A | A |
| Exemplary embodiment 69 | Ink 65 | 25 | — | A | A | A |
| Exemplary embodiment 70 | Ink 66 | 25 | — | A | A | A |
| Exemplary embodiment 71 | Ink 67 | 25 | — | A | A | A |
| Exemplary embodiment 72 | Ink 68 | 25 | — | A | A | A |
| Exemplary embodiment 73 | Ink 69 | 25 | — | A | A | A |
| Exemplary embodiment 74 | Ink 70 | 25 | — | B | A | A |
| Exemplary embodiment 75 | Ink 71 | 25 | — | B | A | A |
| Exemplary embodiment 76 | Ink 72 | 25 | — | B | A | A |
| Exemplary embodiment 77 | Ink 73 | 25 | — | B | A | A |
| Exemplary embodiment 78 | Ink 74 | 25 | — | B | A | A |
| Exemplary embodiment 79 | Ink 75 | 25 | — | A | A | B |
| Exemplary embodiment 80 | Ink 76 | 25 | — | B | A | B |
| Exemplary embodiment 81 | Ink 77 | 25 | — | B | A | B |
| Exemplary embodiment 82 | Ink 78 | 25 | — | A | AA | B |
| Exemplary embodiment 83 | Ink 79 | 25 | — | B | A | B |
| Exemplary embodiment 84 | Ink 80 | 25 | — | A | A | B |

TABLE 11

Recodring Conditions and Evaluation Results

| | | Recording conditions | | Evaluation results | | |
|---|---|---|---|---|---|---|
| | | Surface temperature of | Tension applied to | | | |
| Embodiment No. | Ink No. | recording medium to which ink is applied (° C.) | recording medium (N/m) | Optical density of images | Scratch resistance of images | Ejection stability |
| Comparative example 1 | Ink 81 | 25 | — | C | A | B |
| Comparative example 2 | Ink 82 | 25 | — | C | A | B |
| Comparative example 3 | Ink 83 | 25 | — | C | A | B |
| Comparative example 4 | Ink 84 | 25 | — | C | A | B |
| Comparative example 5 | Ink 85 | 25 | — | C | A | B |
| Comparative example 6 | Ink 86 | 25 | — | C | A | B |
| Comparative example 7 | Ink 87 | 25 | — | C | A | B |

TABLE 11-continued

Recodring Conditions and Evaluation Results

| Embodiment No. | Ink No. | Surface temperature of recording medium to which ink is applied (° C.) | Tension applied to recording medium (N/m) | Optical density of images | Scratch resistance of images | Ejection stability |
|---|---|---|---|---|---|---|
| Comparative example 8 | Ink 88 | 25 | — | C | A | B |
| Comparative example 9 | Ink 89 | 25 | — | C | A | B |
| Comparative example 10 | Ink 90 | 25 | — | C | A | B |
| Comparative example 11 | Ink 91 | 25 | — | C | A | B |
| Comparative example 12 | Ink 92 | 25 | — | C | A | B |
| Comparative example 13 | Ink 93 | 25 | — | C | A | B |
| Comparative example 14 | Ink 94 | 25 | — | C | A | B |
| Comparative example 15 | Ink 95 | 25 | — | C | A | B |
| Comparative example 16 | Ink 96 | 25 | — | C | A | B |
| Comparative example 17 | Ink 97 | 25 | — | C | A | B |
| Comparative example 18 | Ink 98 | 25 | — | C | A | A |
| Comparative example 19 | Ink 99 | 25 | — | C | A | A |
| Comparative example 20 | Ink 100 | 25 | — | C | A | A |
| Comparative example 21 | Ink 101 | 25 | — | C | A | A |
| Comparative example 22 | Ink 102 | 25 | — | C | A | A |
| Comparative example 23 | Ink 103 | 25 | — | C | A | A |
| Comparative example 24 | Ink 104 | 25 | — | C | A | A |
| Comparative example 25 | Ink 105 | 25 | — | C | A | A |
| Comparative example 26 | Ink 106 | 25 | — | C | A | A |
| Comparative example 27 | Ink 107 | 25 | — | C | A | A |
| Comparative example 28 | Ink 108 | 25 | — | C | A | A |
| Comparative example 29 | Ink 109 | 25 | — | C | A | A |
| Comparative example 30 | Ink 110 | 25 | — | A | C | A |

TABLE 12

Recodring Conditions and Evaluation Results

| Embodiment No. | Ink No. | Surface temperature of recording medium to which ink is applied (° C.) | Tension applied to recording medium (N/m) | Optical density of images | Scratch resistance of images | Ejection stability |
|---|---|---|---|---|---|---|
| Comparative example 31 | Ink 111 | 25 | — | C | B | B |
| Comparative example 32 | Ink 112 | 25 | — | C | A | B |
| Comparative example 33 | Ink 113 | 25 | — | C | A | B |
| Comparative example 34 | Ink 114 | 25 | — | C | A | B |
| Comparative example 35 | Ink 115 | 25 | — | C | A | B |
| Comparative example 36 | Ink 116 | 25 | — | C | A | B |
| Comparative example 37 | Ink 117 | 25 | — | C | A | B |
| Comparative example 38 | Ink 118 | 25 | — | C | A | B |
| Comparative example 39 | Ink 119 | 25 | — | C | A | B |
| Comparative example 40 | Ink 120 | 25 | — | C | A | B |
| Comparative example 41 | Ink 121 | 25 | — | C | A | B |
| Comparative example 42 | Ink 122 | 25 | — | C | A | B |
| Comparative example 43 | Ink 123 | 25 | — | C | A | B |
| Comparative example 44 | Ink 124 | 25 | — | C | A | B |
| Comparative example 45 | Ink 125 | 25 | — | C | A | B |
| Comparative example 46 | Ink 126 | 25 | — | C | A | B |
| Comparative example 47 | Ink 127 | 25 | — | C | A | B |
| Comparative example 48 | Ink 128 | 25 | — | C | A | B |
| Comparative example 49 | Ink 129 | 25 | — | C | A | A |
| Comparative example 50 | Ink 130 | 25 | — | C | A | A |
| Comparative example 51 | Ink 131 | 25 | — | C | A | A |
| Comparative example 52 | Ink 132 | 25 | — | C | A | A |
| Comparative example 53 | Ink 133 | 25 | — | C | A | A |
| Comparative example 54 | Ink 134 | 25 | — | C | A | A |
| Comparative example 55 | Ink 135 | 25 | — | C | A | A |
| Comparative example 56 | Ink 136 | 25 | — | C | A | A |
| Comparative example 57 | Ink 137 | 25 | — | C | A | A |

TABLE 12-continued

Recodring Conditions and Evaluation Results

| Embodiment No. | Ink No. | Recording conditions | | Evaluation results | | |
|---|---|---|---|---|---|---|
| | | Surface temperature of recording medium to which ink is applied (° C.) | Tension applied to recording medium (N/m) | Optical density of images | Scratch resistance of images | Ejection stability |
| Comparative example 58 | Ink 138 | 25 | — | C | A | A |
| Comparative example 59 | Ink 139 | 25 | — | C | A | A |
| Comparative example 60 | Ink 140 | 25 | — | C | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-088605 filed Apr. 22, 2014, which is hereby incorporated by reference herein in its entirety.

What is claimed is:

1. An ink comprising: a self-dispersing pigment; polymer particles; a surfactant; a water-soluble organic solvent; and water,
wherein an amount of anionic functional group on the surface of the polymer particles is 0.2 mmol/g or less, the surfactant is represented by the following general formula (1) and contains a fluorinated surfactant having a hydrophile-lipophile balance (HLB) of 11 or less as determined by a Griffin method, $$R^1(CR^2R^3)_nCH_2CH_2(OCH_2CH_2)_mOH \quad (1)$$

wherein $R^1$ denotes a fluorine atom or a hydrogen atom, $R^2$ and $R^3$ independently denote a fluorine atom or a hydrogen atom, and at least one of $R^2$ and $R^3$ denotes a fluorine atom, n is 1 or more and 30 or less, and m is 1 or more and 60 or less, and
the water-soluble organic solvent contains at least one water-soluble organic solvent selected from the following group A:
glycerin, ethylene glycol, diethylene glycol, poly(ethylene glycol) having a weight-average molecular weight of 10,000 or less, 1,3-propanediol, 1,4-butanediol, and diglycerol.

2. The ink according to claim 1, wherein the ink contains at least one additive agent selected from the following group B: tetritol, pentitol, hexitol, heptitol, octitol, and poly(ethylene glycol) having a weight-average molecular weight of more than 10,000 and 100,000 or less.

3. The ink according to claim 1, wherein the ratio of the self-dispersing pigment content to the polymer particle content of the ink is 0.5 or more and 4.0 or less on a mass basis.

4. The ink according to claim 1, wherein a total amount of water-soluble organic solvent(s) selected from the group A is greater than a total amount of water-soluble organic solvent(s) not belonging to the group A on a mass basis.

5. The ink according to claim 1, wherein the ratio of the total amount of water-soluble organic solvent(s) selected from the group A to the total amount of water-soluble organic solvent(s) not belonging to the group A in the ink is 3 or more on a mass basis.

6. The ink according to claim 1, wherein the amount of surfactant(s) other than the fluorinated surfactant is 0.1% by mass or less of the ink.

7. The ink according to claim 1, wherein the polymer particles are at least one selected from polyurethane polymer particles and acrylic polymer particles.

8. The ink according to claim 1, wherein the polymer particles are polyurethane polymer particles.

9. The ink according to claim 1, wherein the polymer particles are acrylic polymer particles.

10. The ink according to claim 9, wherein the total of the self-dispersing pigment content and the acrylic polymer particle content of the ink is 12% by mass or less.

11. The ink according to claim 9, wherein the fluorinated surfactant content of the ink is 2% by mass or less.

12. The ink according to claim 9, wherein the acrylic polymer particles have a glass transition temperature of 25° C. or more.

13. An ink cartridge comprising an ink storage portion configured to store an ink, wherein the ink stored in the ink storage portion is the ink according to claim 1.

14. An image-recording method comprising: a conveyance process for conveying a recording medium; and an ink-applying process for applying an ink to the recording medium, wherein the ink is the ink according to claim 1.

15. The image-recording method according to claim 14, further comprising: after the ink-applying process, a heating process for heating the recording medium to which the ink has been applied to a surface temperature of 70° C. or more.

16. The image-recording method according to claim 14, wherein in the ink-applying process the ink is applied to the recording medium to which a tension of 20 N/m or more is applied.

17. The image-recording method according to claim 14, wherein the recording medium is conveyed at a speed of 50 m/min or more in the conveyance process.

* * * * *